(12) United States Patent
Miller et al.

(10) Patent No.: US 12,017,658 B2
(45) Date of Patent: Jun. 25, 2024

(54) METHODS AND SYSTEMS FOR INHIBITING STOP-START FUNCTIONALITY

(71) Applicant: Ford Global Technologies, LLC, Dearborn, MI (US)

(72) Inventors: Kenneth James Miller, Pinckney, MI (US); Douglas Martin, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 768 days.

(21) Appl. No.: 17/116,701

(22) Filed: Dec. 9, 2020

(65) Prior Publication Data

US 2022/0176972 A1 Jun. 9, 2022

(51) Int. Cl.
*B60W 40/09* (2012.01)
*F02N 11/08* (2006.01)
*G08G 1/01* (2006.01)
B60W 40/08 (2012.01)
G06V 20/56 (2022.01)
G06V 20/58 (2022.01)

(52) U.S. Cl.
CPC ......... *B60W 40/09* (2013.01); *F02N 11/0844* (2013.01); *G08G 1/0125* (2013.01); *G08G 1/0145* (2013.01); B60W 2040/0872 (2013.01); G06V 20/584 (2022.01); G06V 20/588 (2022.01)

(58) Field of Classification Search
CPC ......... B60W 40/09; B60W 2040/0872; B60W 2540/10; B60W 2540/12; B60W 2540/22; B60W 2554/4042; B60W 2554/406; B60W 2556/10; B60W 2556/50; B60W 2556/65; B60W 30/18154; B60W 30/18018; B60W 40/04; F02N 11/0844; F02N 2200/104; F02N 11/0818; F02N 11/0837; F02N 11/0822; F02N 2200/105; F02N 2200/123; F02N 2200/125; G08G 1/0125; G08G 1/0145; G08G 1/096758; G08G 1/096783; G08G 1/096791; G08G 1/096725; G06V 20/584; G06V 20/588; H04W 4/027; H04W 4/46
See application file for complete search history.

(56) References Cited

U.S. PATENT DOCUMENTS

| 8,935,075 | B2 * | 1/2015 | Otanez | F02N 11/0837 |
| | | | | 123/179.3 |
| 9,604,635 | B1 | 3/2017 | Johri et al. | |
| 10,112,595 | B2 | 10/2018 | Naserian et al. | |

(Continued)

FOREIGN PATENT DOCUMENTS

WO WO-2018178885 A1 * 10/2018 .......... F02N 11/0822

*Primary Examiner* — Peter D Nolan
*Assistant Examiner* — Demetra R Smith-Stewart
(74) *Attorney, Agent, or Firm* — Vincent Mastrogiacomo; McCoy Russell LLP

(57) ABSTRACT

Methods and systems are provided for selectively disabling a stop-start function of a vehicle based on a predicted anxiety of a driver of the vehicle upon merging into transverse traffic. In one example, selectively disabling the stop-start function of a vehicle based on a predicted anxiety of the driver of the vehicle includes, when approaching an intersection having a first traffic pattern, disabling a stop-start function responsive to an estimated merging acceleration for the intersection exceeding a threshold acceleration rate of the vehicle.

20 Claims, 10 Drawing Sheets

(56) References Cited

U.S. PATENT DOCUMENTS

| | | |
|---|---|---|
| 10,392,002 B2 | 8/2019 | Leone et al. |
| 10,487,762 B2 | 11/2019 | Vadlamani et al. |
| 2010/0023265 A1 | 1/2010 | Huang et al. |
| 2013/0035839 A1* | 2/2013 | Otanez ................ F02N 11/0837 701/102 |
| 2013/0274952 A1 | 10/2013 | Weslati et al. |
| 2020/0010074 A1 | 1/2020 | Follen et al. |

* cited by examiner

METHODS AND SYSTEMS FOR INHIBITING STOP-START FUNCTIONALITY

FIELD

The present description relates generally to methods and systems for controlling engine idle stop and restart activities on a vehicle with an auto-stop feature, and more specifically, to controlling engine idle stop and restart activities when merging into transverse traffic.

BACKGROUND/SUMMARY

A vehicle may be equipped with an engine auto-stop system. An engine auto-stop system automatically shuts down the engine during certain periods of vehicle operation to conserve fuel. For example, engine auto-stop may be engaged when the vehicle is stopped at a traffic light or an intersection rather than permitting the engine to idle. The engine may be restarted when the driver releases the brake or actuates the accelerator pedal. Stopping the engine when it is not needed increases fuel efficiency and reduces emissions.

One challenge posed by engine stop-start systems is that they may cause anxiety in drivers around the potential of the engine not being able to start in high anxiety scenarios, in particular, right-turn and left-turn scenarios where drivers accelerate rapidly from a stopped position to merge into traffic (e.g., when leaving a parking lot, at an intersection, etc.). Solutions that have been implemented to address this challenge include disabling a start/stop function responsive to certain traffic situations, as taught by Follen et al. in U.S. Patent Application Publication No. 2020/0010074, or predictively restarting an engine in anticipation of an acceleration event, as taught by Vadlamani et al. in U.S. Pat. No. 10,487,762.

However, the inventors herein have recognized potential issues with these solutions. Current methods for selectively disabling/enabling a stop-start system may be based on general criteria, and may not address traffic patterns associated with high anxiety in right-turn and left-turn scenarios, such as an amount of traffic in one or both directions, a relative velocity of the traffic, or differences in a velocity of one or more vehicles in the traffic. Current methods also do not consider variations in driver anxiety across drivers and when negotiating different merge scenarios. For example, driver anxiety may be higher when merging into traffic on a left turn than when merging into traffic on a right turn (e.g., transverse traffic in both directions vs. transverse traffic in one direction), or some drivers may experience more anxiety than other drivers.

In one example, at least some of the issues described above may be addressed by a method for a controller of a vehicle, comprising, when approaching an intersection having a first traffic pattern, disabling a stop-start function responsive to an estimated merging acceleration rate for the intersection exceeding a threshold acceleration rate. Additionally, the estimated merging acceleration rate may be estimated based on data received wirelessly from external sources via a network, such as a connected traffic light and/or one or more vehicles approaching the intersection. By estimating an acceleration rate to merge into a space between oncoming vehicles, and comparing it to a threshold rate of acceleration such as when no traffic is present (e.g., as estimated from historical driver performance data), a level of anxiety of the driver when merging may be addressed, and the stop-start function may be selectively disabled or enabled.

For example, in a first scenario, the vehicle may stop at an intersection with a relatively low volume of transverse traffic (as compared to the second scenario below), where the transverse traffic comprises a plurality of vehicles travelling through the intersection from a left side of the vehicle to a right side of the vehicle. While stopped at the intersection, a controller of the vehicle may receive, via a vehicle-to-vehicle (V2V) wireless network, a velocity and location of one or more, or each approaching vehicle of the plurality of vehicles in real time. Based on the velocity and location of each approaching vehicle, the controller may estimate an acceleration rate of the vehicle to merge into the transverse traffic as the vehicle turns right. In response to the acceleration rate being below a threshold acceleration rate of the driver on a right turn with no transverse traffic, the controller may infer that merging into traffic will not generate anxiety in the driver greater than a threshold. As a result of merging into traffic not generating anxiety in the driver greater than the threshold, the stop-start controller may not disable the stop-start function, whereby the stop-start controller may, depending on operating conditions determined by the controller, turn off the engine while the vehicle is stopped at the intersection to reduce emissions and increase fuel efficiency. When the driver releases a brake of the vehicle and actuates an accelerator of the vehicle, the stop-start controller may start the engine to provide power to the vehicle.

In a second scenario, the vehicle may stop at an intersection with a relatively high volume of transverse traffic, as compared with the first scenario. While stopped at the intersection, the controller may estimate a merging acceleration rate of the vehicle to merge into the traffic as the vehicle turns right into the high transverse traffic. In response to the estimated merging acceleration rate being higher (e.g., a more rapid acceleration) than the threshold acceleration rate of the driver on a right turn with no traffic, the controller may infer that merging into traffic will generate anxiety in the driver. As a result of merging into traffic generating anxiety in the driver greater than a threshold, the stop-start controller may disable the stop-start function, whereby the stop-start controller may not turn off the engine of the vehicle while the vehicle is stopped at the intersection. By maintaining the engine on while stopped at the intersection, an anxiety of the driver may be reduced. In this way, the engine auto stop-start function may be selectively enabled or disabled based on a predicted driver anxiety to minimize driver anxiety in transverse traffic merging scenarios. An additional advantage of the method is that a tradeoff between an increased fuel economy and a reduced anxiety may be averted, whereby both an increased fuel economy and a reduced anxiety may be achieved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
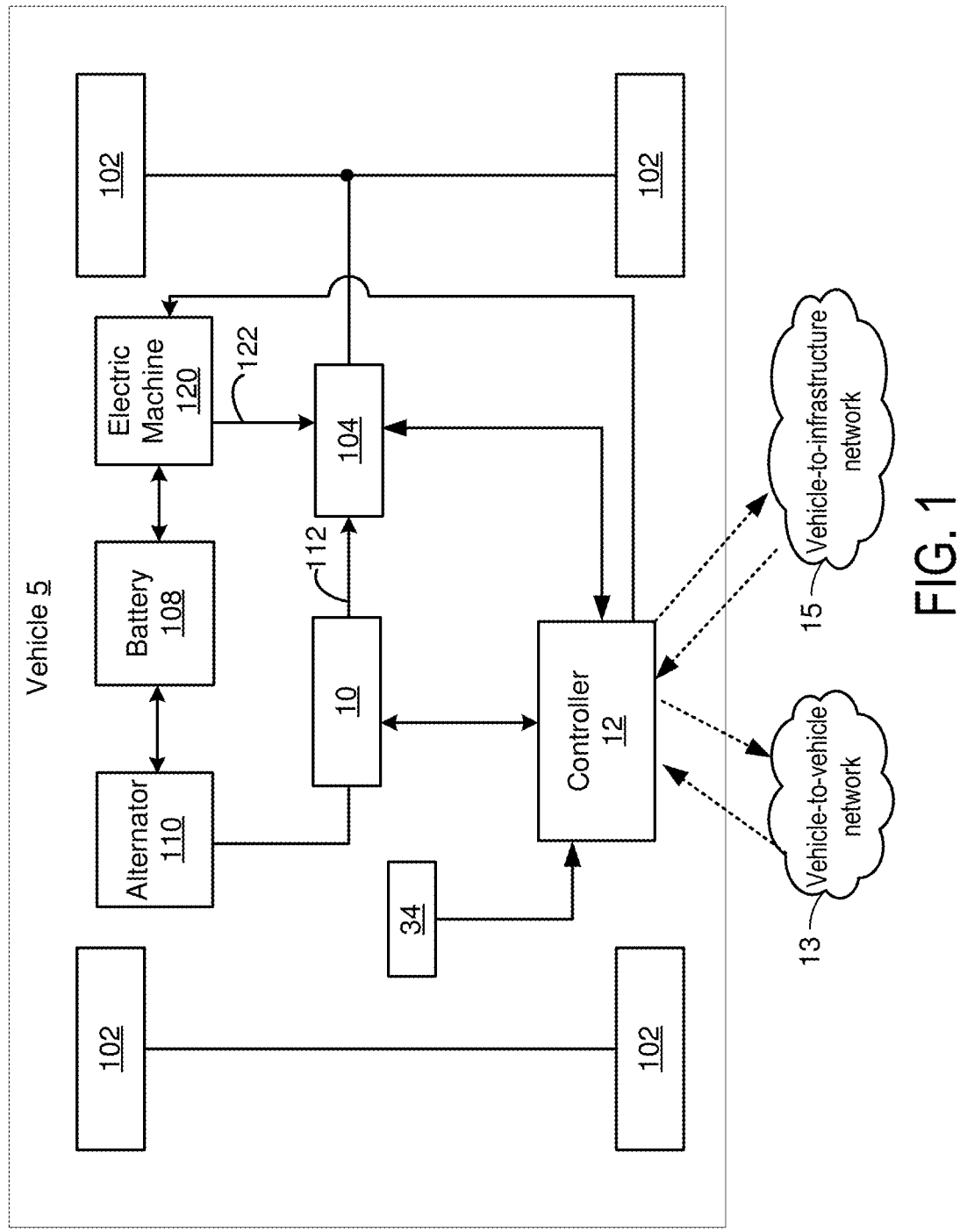
FIG. 1 shows a schematic depiction of a vehicle system.

The following description relates to systems and methods for selectively disabling a stop-start function of a vehicle based on a predicted anxiety level of a driver of the vehicle surrounding merging from a first road into transverse traffic on a second road. For the purposes of this disclosure, transverse traffic is defined as traffic travelling past a location of a merging vehicle in a first direction from a left side of the merging vehicle to a right side of the merging vehicle, or traffic travelling past the location of the merging vehicle in a second direction from the right side of the merging vehicle to the left side of the merging vehicle. The merging vehicle may face transverse traffic when exiting a parking lot onto a street, or at an intersection, where vehicles may be approaching from the left, in the first direction, or the right, in the second direction. In some examples, the transverse traffic may comprise a plurality of vehicles traveling in the first direction and/or the second direction, while in other examples, the transverse traffic may comprise a single vehicle traveling in the first direction and/or the second direction. While a perpendicular intersection is one example described in detail herein, the roads may be angled with respect to each other and thus not necessarily at right angles. For example, the intersection may be a Y intersection. In another example, the first road may be an onramp and the second road may be a highway. It should be appreciated that the examples provided herein are for illustrative purposes, and the transverse traffic may occur on other example roads and/or types of intersections without departing from the scope of this disclosure.

As mentioned herein, disabling a stop-start function of a vehicle with an engine auto-stop system refers to the stop-start controller disabling an automatic shut-off an engine of the vehicle in response to a set of operating conditions having been met, until a threshold time has elapsed and/or a change in the operating conditions occurs. In one example, the set of operating conditions includes an engine idle situation when the vehicle is in a stopped condition at a location of a traffic stop, and the change in operating conditions includes an engagement of one or more gears of a transmission of the vehicle as the vehicle proceeds through the traffic stop. For example, when the stop-start function is enabled, the stop-start controller may automatically shut off the engine when the vehicle is waiting at a stoplight to increase a fuel efficiency of the vehicle. However, if the stop-start function is disabled prior to reaching or at the stoplight, the engine is not automatically shut off when the vehicle is idling at the stoplight. After one or more gears of a transmission are engaged and the vehicle moves through the stoplight and/or a threshold time passes (e.g., 10 seconds), disabling of the stop-start function may end, whereby the stop-start function is enabled. In another example, the gears of the transmission may remain engaged while the engine is shut off with a torque converter unlocked (e.g., by employing one or more separate clutches) by maintaining certain clutches engaged by operating an electric pump to maintain pressure in the transmission lines such that the engine is in gear when the engine is switched on, and the change in operating conditions includes a change of a position of a brake pedal, or an accelerator pedal.

In one example, disabling the stop-start function includes, if the engine is on, maintaining the engine on, and if the engine is off, starting the engine. For example, a disabling of the stop-start function may occur prior to the vehicle stopping at the traffic stop, whereby an operation of the engine is maintained after the vehicle stops at the traffic stop. Alternatively, the disabling of the stop-start function may occur at or after a time of the vehicle stopping at the traffic stop, whereby the engine is turned off by the stop-start controller upon the vehicle stopping, and started when the vehicle is commanded to move.

Figure 2:
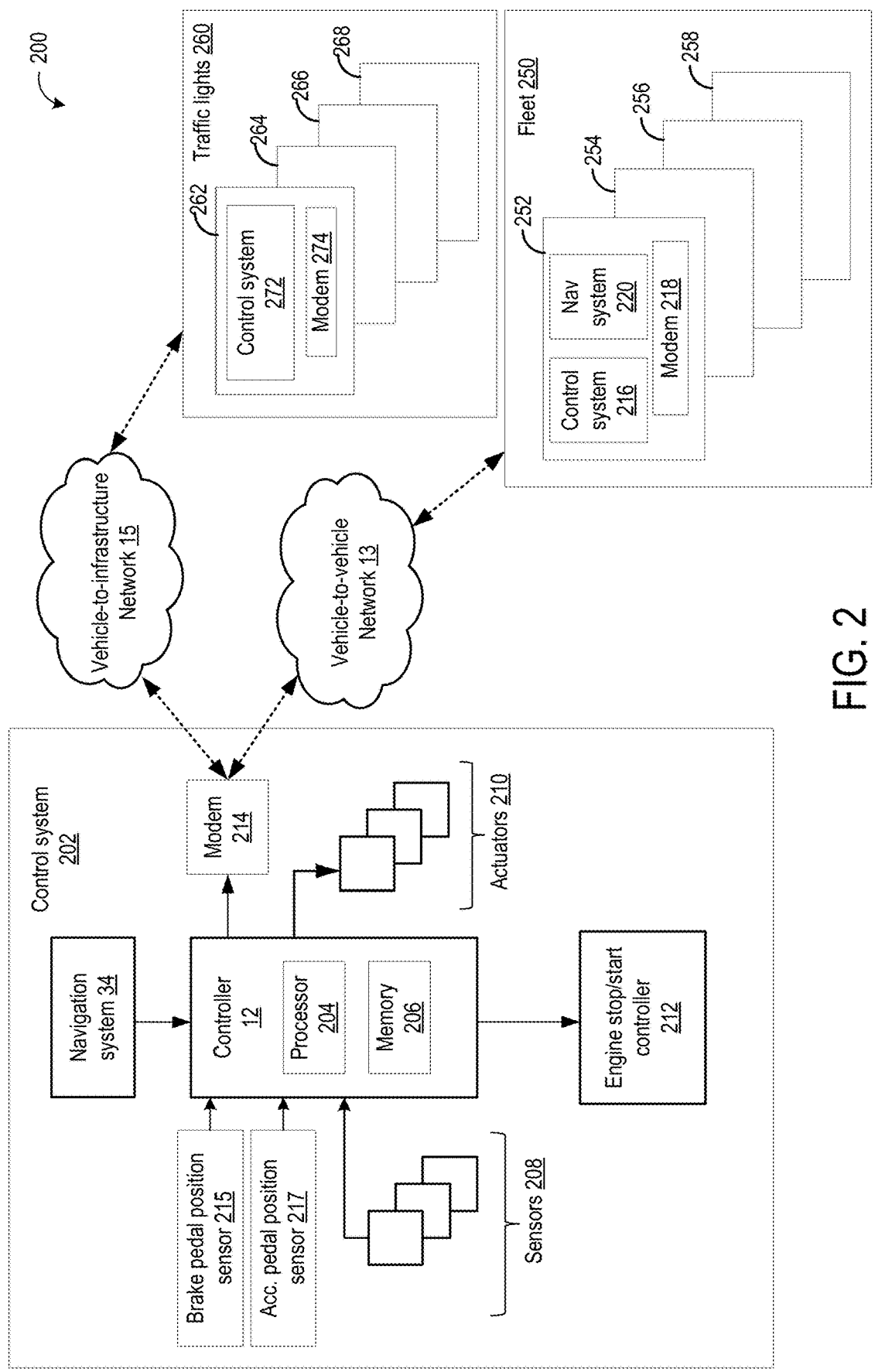
FIG. 2 shows an example embodiment of a vehicle control system, in communication with an external network of vehicles and connected traffic lights.
Figure 3:
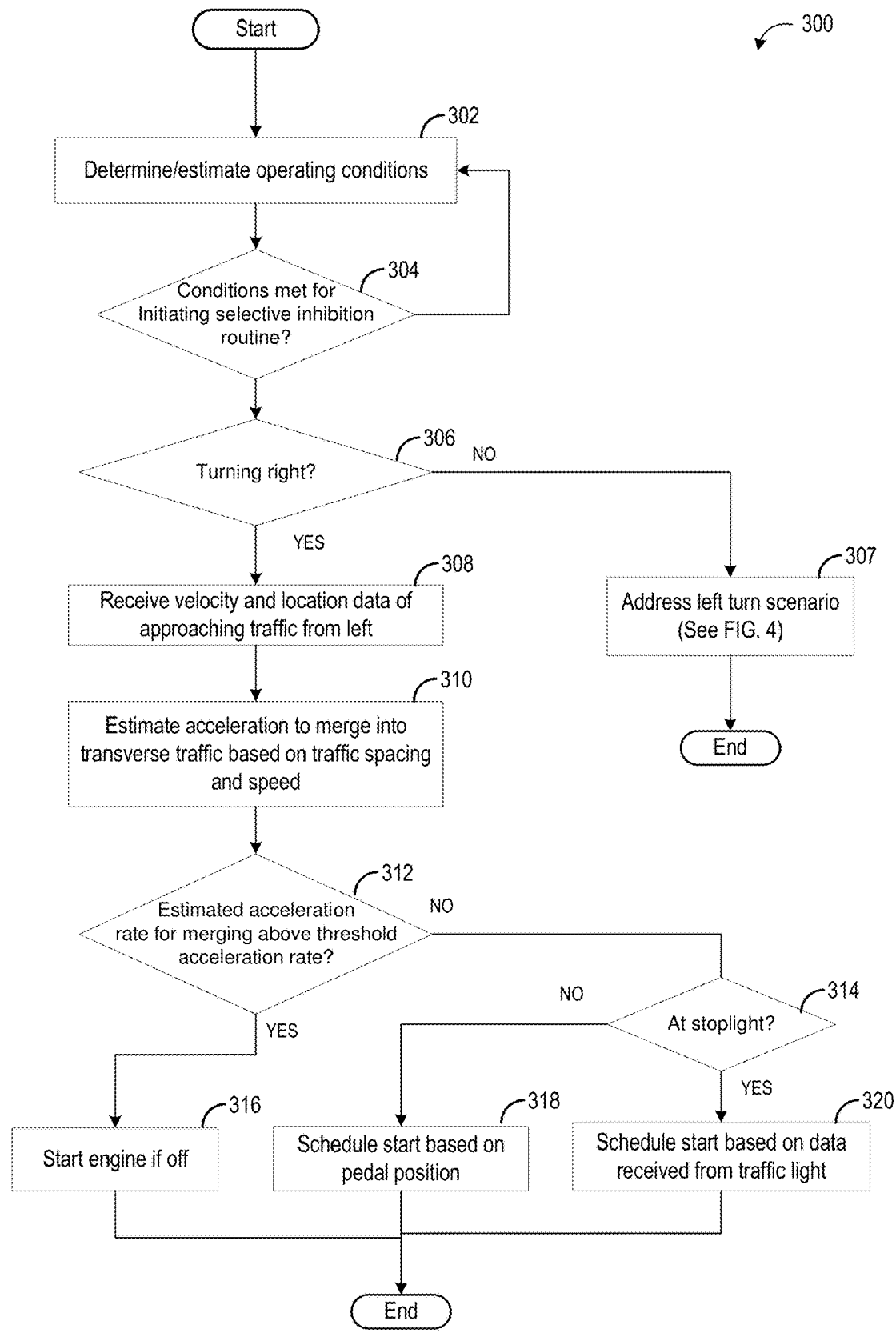
FIG. 3 shows a flow chart illustrating an example method for controlling an engine stop/start controller when merging into traffic during a right turn.
Figure 4:
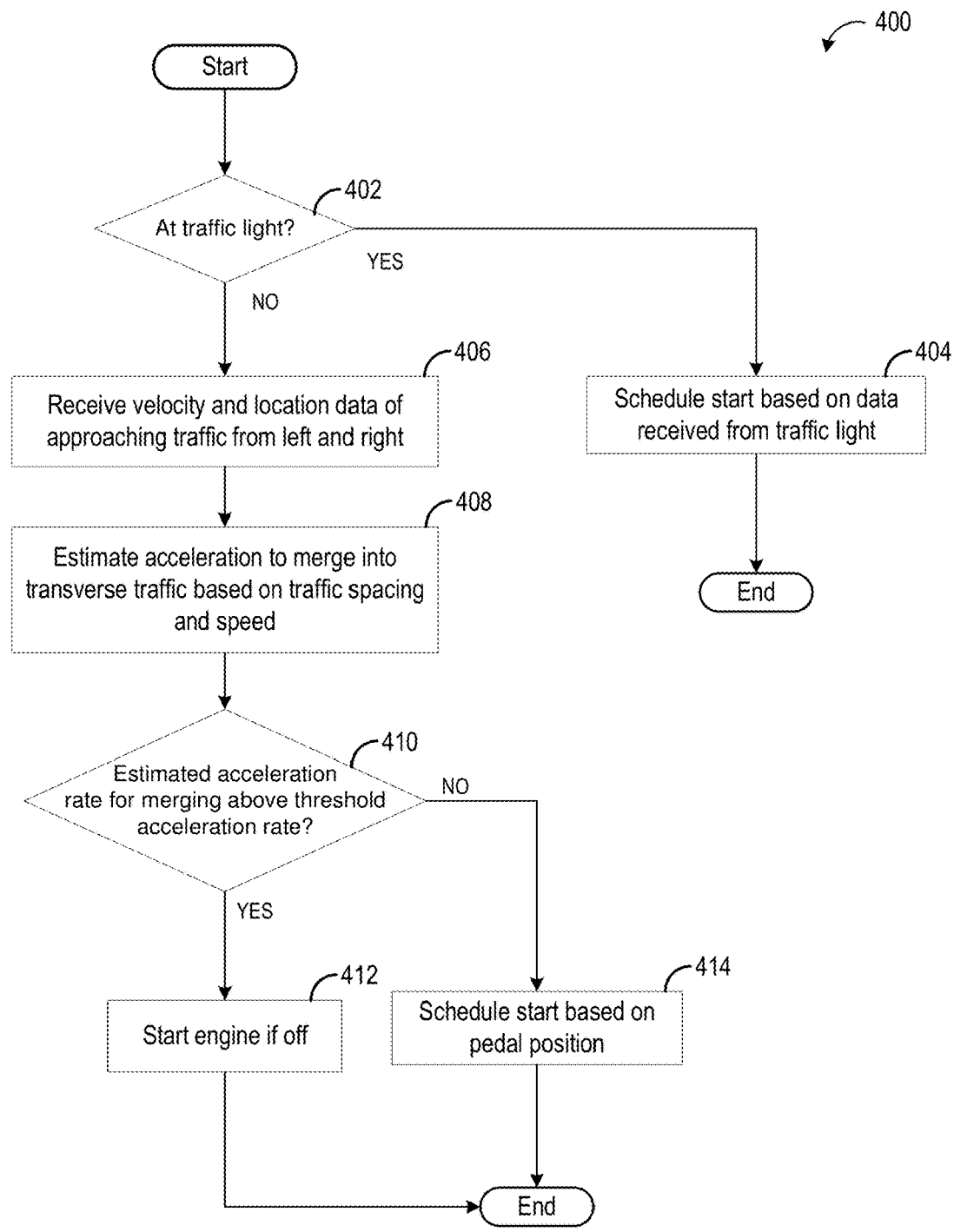
FIG. 4 shows a flow chart illustrating an example method for controlling an engine stop/start controller when merging into traffic during a left turn.
Figure 7A:
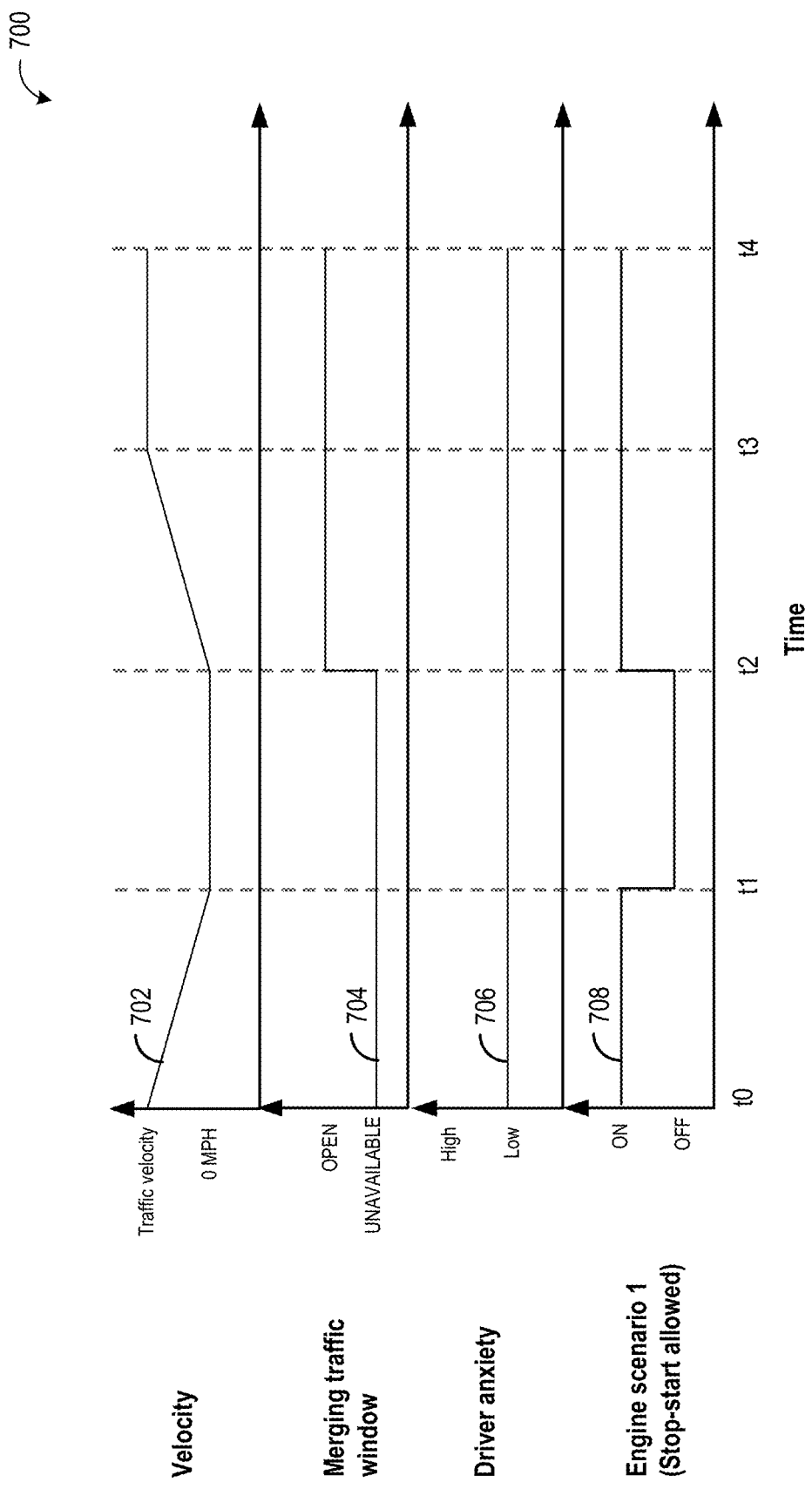
FIG. 7A is a timing diagram that shows a sequence of events as a vehicle merges into a right lane of transverse traffic in a low-anxiety scenario.

An example vehicle is depicted in FIG. 1. The vehicle may include a control system, which may be in communication with one or more other vehicles and/or traffic lights via a vehicle-to-vehicle network, as shown in FIG. 2. FIG. 3 describes an exemplary procedure for selectively disabling an engine stop-start function when merging into traffic on a right-hand turn, as depicted in FIGS. 5A, 5B, 5C, and 5D. FIG. 4 describes an exemplary procedure for selectively disabling an engine stop-start function when merging into traffic on a left-hand turn, as depicted in 6A, 6B, 6C, and 6D. FIG. 7A shows a timing of a sequence of events that occur as the vehicle merges into transverse traffic travelling from left to right in a low-anxiety scenario, in contrast with FIG. 7B, which shows a timing of a sequence of events that occur as the vehicle merges into transverse traffic travelling from left to right in a high-anxiety scenario. Similarly, FIG. 8A shows a timing of a sequence of events that occur as the vehicle passes through a first stream of transverse traffic travelling from left to right to merge into a second stream of transverse traffic travelling from right to left in a low-anxiety scenario, while FIG. 8B shows a timing of a sequence of events that occur as the vehicle passes through a first stream of transverse traffic travelling from left to right to merge into a second stream of transverse traffic travelling from right to left in a high-anxiety scenario.

Referring now to FIG. 1, an example vehicle 5 is shown. In some examples, vehicle 5 may be a hybrid vehicle with multiple sources of torque available to one or more vehicle wheels 102. In other examples, vehicle 5 is a conventional vehicle with only an engine, or an electric vehicle with only electric machine(s). In the example shown, vehicle 5 includes an internal combustion engine 10 and an electric machine 120. Electric machine 120 may be a motor or a motor/generator. Electric machine 120 may be configured to utilize or consume a different energy source than engine 10. For example, engine 10 may consume a liquid fuel (e.g., gasoline) to produce an engine output while electric machine 120 may consume electrical energy to produce a motor output. As such, the vehicle 5 may be referred to as a hybrid electric vehicle (HEV).

In a non-limiting embodiment, electric machine 120 receives electrical power from a battery 108 to provide torque to vehicle wheels 102. Engine 10 and electric machine 120 are connected to the vehicle wheels 102 via a transmission 104. Transmission 104 may be a gearbox, a planetary gear system, or another type of transmission.

Vehicle 5 may utilize a variety of different operational modes depending on operating conditions encountered. Some of these modes may enable engine 10 to be maintained in an off state where combustion of fuel at the engine is discontinued. For example, under select operating conditions, electric machine 120 may propel the vehicle via transmission 104 as indicated by arrow 122 while engine 10 is deactivated. The select operating conditions may include a stopped condition, wherein the engine 10 may be maintained in an off state while the vehicle 5 is not moving. When the vehicle 5 begins to accelerate, the vehicle 5 may be propelled by electric machine 120, or engine 10 may be switched to an on state and may propel the vehicle 5.

During other operating conditions, electric machine 120 may be operated to charge an energy storage device such as the battery 108. For example, electric machine 120 may receive wheel torque from transmission 104 as indicated by arrow 122 where the motor may convert the kinetic energy of the vehicle to electrical energy for storage at battery 108. Thus, electric machine 120 may provide a generator function in some embodiments. However, in other embodiments, alternator 110 may instead receive wheel torque from transmission 104, or energy from engine 10, where the alternator 110 may convert the kinetic energy of the vehicle to electrical energy for storage at battery 108.

During still other operating conditions, engine 10 may be operated by combusting fuel received from a fuel system (not shown in FIG. 1). For example, engine 10 may be operated to propel the vehicle via transmission 104 as indicated by arrow 112 while electric machine 120 is deactivated. During other operating conditions, both engine 10 and electric machine 120 may each be operated to propel the vehicle via transmission 104 as indicated by arrows 112 and 122, respectively. A configuration where both the engine and the motor may selectively propel the vehicle may be referred to as a parallel type vehicle propulsion system. Note that in some embodiments, electric machine 120 may propel the vehicle via a first drive system and engine 10 may propel the vehicle via a second drive system.

Operation in the various modes described above may be controlled by a controller 12. For example, controller 12 may receive data from a navigation device 34 such as a global positioning system (GPS), a vehicle-to-vehicle (V2V) network such as an off-board V2V network 13, and/or a vehicle-to-infrastructure (V2X) network such as an off-board V2X network 15. Controller 12 will be described below in more detail in reference to FIG. 2.

Turning to FIG. 2, a schematic depiction 200 of additional components of vehicle 5 is shown. The vehicle 5 may include a control system 202. Control system 202 is shown receiving information from a plurality of sensors 208 and sending control signals to a plurality of actuators 210. As one example, sensors 208 may include one or more of an exhaust gas sensor, an upstream and/or downstream temperature sensor, an airflow sensor, a pressure sensor, an air/fuel ratio sensor, a catalyst temperature sensor, and/or a composition sensor, which may be coupled to various locations in the vehicle 5. The sensors 208 may also include a brake pedal position sensor 215, and an accelerator pedal position sensor 217. The actuators may include a fuel injector, a throttle, one or more valves of an engine or fuel system, etc. It should be appreciated that the examples provided herein are for illustrative purposes and other types of sensors and/or actuators may be included without departing from the scope of this disclosure.

The control system 202 may include a controller 12, which may include a processor 204. The processor 204 may generally include any number of microprocessors, ASICs, ICs, etc. The controller 12 may include a memory 206 (e.g., FLASH, ROM, RAM, EPROM and/or EEPROM) that stores instructions that may be executed to carry out one more control routines. As discussed herein, memory includes any non-transient computer readable medium in which programming instructions are stored. For the purposes of this disclosure, the term tangible computer readable medium is expressly defined to include any type of computer readable storage. The example methods and systems may be implemented using coded instruction (e.g., computer readable instructions) stored on a non-transient computer readable medium such as a flash memory, a read-only memory (ROM), a random-access memory (RAM), a cache, or any other storage media in which information is stored for any duration (e.g. for extended period time periods, permanently, brief instances, for temporarily buffering, and/or for caching of the information). Computer memory of computer readable storage mediums as referenced herein may include volatile and non-volatile or removable and non-removable media for a storage of electronic-formatted information such as computer readable program instructions or modules of computer readable program instructions, data, etc. that may be stand-alone or as part of a computing device. Examples of computer memory may include any other medium which can be used to store the desired electronic format of information and which can be accessed by the processor or processors or at least a portion of a computing device.

In general, controller 12 receives input from various vehicle sensors 208 that indicate engine, transmission, electrical and climate states. A vehicle velocity may also be communicated to controller 12 through a velocity sensor. The controller 12 may receive input from the brake pedal position sensor 215 and/or the accelerator pedal position sensor 217, and a navigation system 34. The navigation system 34 may receive information from the vehicle velocity sensor, GPS, traffic flow data, local gradient maps, etc. In one example, the navigation system 34 is an onboard GPS system, and information accessed via the navigation system 34 is used to predict and determine durations of upcoming vehicle stop events.

The controller 12 may receive input data from the various sensors 208, process the input data, and trigger the actuators 210 in response to the processed input data based on instructions stored in the memory 206. For example, the controller 12 may receive input data from an air/fuel ratio sensor indicating that an air/fuel ratio of the engine is low, and as a result, the controller 12 may command a fuel injector to adjust the air/fuel ratio.

The control system 202 may include an engine stop/start controller 212 that includes appropriate start/stop logic and/or controls for controlling an auto-stop system of an engine (e.g., engine 10 of the vehicle 5 of FIG. 1). An engine auto-stop system may shut down the engine during certain periods of vehicle operation to conserve fuel. For example, the auto-stop system may shut the engine off during engine idle conditions where the engine is not used for propulsion or other purposes. The auto-stop system may then restart the engine when desired for propulsion or other purposes. By disabling the engine when not in use, overall fuel consumption may be reduced, and an amount of emissions may be reduced.

The engine stop/start controller 212 may be configured to initiate an auto-stop or auto-start of the engine during various operating conditions. As the vehicle comes to a stop, for example, the controller 12 may command the engine stop/start controller 212 to stop the engine, thus preventing the alternator or integrated starter generator from providing electric current to the electrical loads. The battery may provide electric current to the electrical loads while the engine is stopped. As the brake pedal is disengaged (and/or the accelerator pedal is engaged) after an engine auto-stop, responsive to signals from the brake pedal position sensor 215 and/or the acceleration pedal position sensor 217, the controller 12 may command the engine stop/start controller 212 to start the engine, thus enabling the alternator or integrated starter generator to provide electric current to the electrical loads.

The control system 202 may include a modem 214. Via the modem 214, the controller 12 may communicate with other vehicle controllers over the V2V network 13 and a fleet of vehicles 250 including a vehicle 252, a vehicle 254, a vehicle 256, and a vehicle 258. In one example, the controller 12 may communicate with other vehicle controllers over the V2V network 13 in real time. The V2V network may be a controller area network (CAN), which may be implemented using any number of communication protocols generally known. Using the modem 214, the vehicle 5 may retrieve data from the vehicles 252, 254, 256, and 258 via the V2V network 13, such as road or traffic condition data from a vehicle traveling ahead of the vehicle 5 on a route of the vehicle 5. The controller 12 may adjust one or more system settings of the vehicle 5 in anticipation of the upcoming road or traffic condition. For example, the controller 12 may receive velocity and position data of one or more vehicles approaching an intersection, which may be used to estimate an acceleration rate of the vehicle to merge into a space between the one or more vehicles.

In one example, the vehicles 252, 254, 256, and 258 of fleet 250 may each be similar in make and model to the vehicle 5. In other examples, the vehicles 252, 254, 256, and 258 of fleet 250 may be vehicles within a threshold distance of vehicle 5. In one example, the threshold distance may be defined as a distance within which one or more road conditions experienced by the vehicles 252, 254, 256, and 258 are considered to be similar to those of vehicle 5. In another example, the threshold distance may be a distance that the vehicle 5 can cover in a pre-established duration (e.g., 1 minute), whereby a road attribute located at the threshold distance is reached in 1 minute. Each of the vehicles 252, 254, 256, and 258 of fleet 250 may include a control system 216, a modem 218, and a navigation system 220, which may be the same as or similar to the control system 202, navigation system 34, and a modem 214 of the vehicle 5. The on-board controllers in the vehicles 252, 254, 256, and 258 may communicate with each other and to the on-board controller in vehicle 5 via their respective modem 218, navigation system 220, and/or via other forms of V2V technology.

Via the modem 214, the controller 12 may also communicate with one or more traffic lights (also referred to herein as stoplights) 260 over the V2X network 15, including a traffic light 262, a traffic light 264, a traffic light 266, and a traffic light 268. The traffic lights 262, 264, 266, and 268 may each have a respective control system 272 and modem 274, through which the respective control system 272 may communicate with the modem 214 of vehicle 5. In some examples, the controller 12 may communicate with the respective control system 272 through modem 274 over the V2X network 15 in real time. Using the modem 274, the vehicle 5 may retrieve data from the traffic lights 262, 264, 266, and 268 via the V2X network 15. For example, the data may include a state of a traffic light (e.g., green, red, etc.), a timing of the traffic light (e.g., when the traffic light is going to change), and one or more road conditions, traffic conditions, and/or weather conditions at a location of the traffic light. In response to signals transmitted from the traffic light via a respective modem 274, and received by the modem 214, the controller 12 may adjust one or more system settings of the vehicle 5 in response to the state and/or timing of the traffic light and/or road, traffic, and/or weather conditions at the location of the traffic light.

Various kinds of data may be exchanged between the modem 214 of vehicle 5, the modems 274 of the traffic lights 260, and the modems 218 of the fleet 250. In some examples, the data is transmitted wirelessly using cellular data technologies and networks provided by telecommunications providers, which may be fourth generation (4G) mobile networks or fifth generation (5G) mobile networks. The data may include a preview of upcoming traffic conditions, types of roads, accidents or construction along the route, stalled or stopped vehicles, number of traffic lights, and the like, all of which may be received concurrently or sequentially. Information relayed within the vehicle network may include one or more of a vehicle velocity, a vehicle location, an average velocity of vehicles travelling together, a brake rate of the vehicle, and the like. For example, a congestion in traffic may be deduced from an average velocity of one or more vehicles, a high braking rate of one or more vehicles, and/or a close proximity of vehicles (e.g., detecting tail lights, etc.). In other examples, higher average velocities maintained for longer duration and braking rates that are low may indicate cruising conditions. In still other examples, an extended idle condition may be inferred when the average velocity of the vehicles in the network is near zero for a long period of time.

In some examples, the data may include traffic light data comprising a state of the traffic light (e.g., red, green, or yellow), a duration of the state of the traffic light (e.g., 30 seconds), a timing of the traffic light (e.g., a time remaining until the traffic light changes), one or more upcoming states and durations of states of the traffic light, and so forth. The traffic light data may be used by the controller 12 to adjust one or more settings of the vehicle 5. For example, if the vehicle 5 is an autonomous vehicle, when approaching the traffic light, the controller 12 may use the traffic light data to predict a state of the traffic light upon the vehicle 5 reaching the traffic light. Based on the predicted state of the traffic light upon the vehicle 5 reaching the traffic light, the controller may increase a velocity of the vehicle 5 to pass through the traffic light before it turns red, or decrease the velocity of the vehicle 5 to safely stop the vehicle 5 at the traffic light before it turns red, or adjust a velocity of the vehicle 5 to ensure that the state of the traffic light permits the vehicle 5 to pass through the traffic light upon reaching the traffic light. In another example, the engine stop-start controller 212 may schedule an engine start after an idle-stop event to coincide with a change of a signal of the traffic light from red (e.g., stop) to green (e.g., go).

As yet another example, the vehicle 5 may be stopped at a traffic light in a state where the traffic light is red for the vehicle 5, where the vehicle 5 is turning right. A driver of the vehicle may decide to merge into a stream of transverse traffic comprising a plurality of vehicles travelling from a left side of the driver to a right side of the driver (e.g., and not wait for the state of the traffic light to change to green). In anticipation of merging into the stream of transverse traffic, the driver may experience an increased anxiety, for example, due to a risk associated with merging. The anxiety of the driver may be increased by a stop-start function of the vehicle 5, whereby the engine is shut off during an engine idle to save fuel and reduce emissions. The controller 12 may receive, via the modem 214, a velocity and a location of each vehicle of the plurality of vehicles of the stream of transverse traffic in real time. From the velocity and location of each vehicle, the controller 12 may estimate a merging acceleration rate of the vehicle 5 to merge into a space within the stream of transverse traffic (herein, a merge window). The controller 12 may further compare the estimated merging acceleration rate with a threshold acceleration rate of the driver during conditions where there is no traffic. In one example, the threshold acceleration rate is estimated from historical performance data of the driver and stored in a lookup table. If the estimated merging acceleration rate is higher than the threshold acceleration rate of the driver, the controller 12 may selectively disable the engine stop-start controller 212 prior to the engine stop-start controller 212 shutting off the engine, thereby reducing the anxiety of the driver. In this way, data from a connected vehicle fleet may be used to selectively disable or enable the stop-start function based on a predicted anxiety of the driver.

In FIG. 3, an exemplary method 300 shows a procedure for determining whether to selectively disable an engine stop-start function of a merging vehicle, such as the vehicle 5 of FIG. 1, when merging into traffic during a right turn. Instructions for carrying out method 300 and the rest of the methods included herein may be executed by a controller (and/or a stop-start controller) of the merging vehicle, and more specifically, by a processor of the controller of the merging vehicle, based on instructions stored on a memory of the controller, in conjunction with signals received from sensors of the engine system (e.g., the processor 204, memory 206, and sensors 208 of control system 202 described above in reference to FIG. 2).

As those of ordinary skill in the art will understand, the functions represented by the flow chart blocks may be performed by software and/or hardware. Depending upon the particular processing strategy, such as event-driven, interrupt-driven, etc., the various functions may be performed in an order or sequence other than illustrated in the figure. Similarly, one or more steps or functions may be repeatedly performed, although not explicitly illustrated. In one embodiment, the functions illustrated are primarily implemented by software, instructions, or code stored in a computer readable storage medium and executed by one or more microprocessor-based computers or controllers to control operation of the vehicle.

At 302, method 300 includes estimating and/or measuring vehicle operating conditions of the merging vehicle. Vehicle operating conditions may be estimated based on one or more outputs of various sensors of the merging vehicle (e.g., such as oil temperature sensors, engine velocity or wheel velocity sensors, torque sensors, etc., as described above in reference to vehicle 5 of FIG. 1). Vehicle operating conditions may include engine velocity and load, vehicle velocity, transmission oil temperature, exhaust gas flow rate, mass air flow rate, coolant temperature, coolant flow rate, engine oil pressures (e.g., oil gallery pressures), operating modes of one or more intake valves and/or exhaust valves, electric motor velocity, battery charge, engine torque output, vehicle wheel torque, etc. Estimating and/or measuring vehicle operating conditions may include determining whether the vehicle is being powered by an engine or an electric motor (e.g., the engine 110 or the electric motor 120 of vehicle propulsion system 100 of FIG. 1).

At 304, method 300 includes determining whether conditions are met for initiating a selective inhibition routine of the stop-start function of the merging vehicle. Determining whether conditions are met for initiating a selective inhibition routine may include determining whether the stop-start function of the merging vehicle is enabled or disabled, where if the stop-start function of the merging vehicle is enabled, the engine is turned off during an engine-idle event, and if the stop-start function of the vehicle is disabled, the engine is not turned off during an engine-idle event. For example, the stop-start function may be disabled if a state of charge of a battery of the merging vehicle is below a threshold state of charge (e.g., 20%), whereby the battery does not have a sufficient charge to turn the engine off during the engine-idle event. As another example, the stop-start function may be disabled by a manual switch on a dashboard of the merging vehicle, or by different selective inhibition routine, for example, if an increased anxiety level of the driver is detected (e.g., via a dashboard camera of the vehicle, etc.). If the stop-start function is disabled, conditions may not be met for initiating the selective inhibition routine.

In one example, the conditions for initiating the selective inhibition routine of the stop-start function of the merging vehicle include the merging vehicle being stopped in a position where the merging vehicle is facing a road, and where the driver has an option to turn left on the road, turn right on the road, or bear to the right on the road. If the merging vehicle is stopped and facing the road with a right and/or left turn option, conditions may be met for initiating the selective inhibition routine, and if the merging vehicle is not stopped facing the road with a right and/or left turn option, conditions may not be met for initiating the selective inhibition routine. For example, the merging vehicle may be stopped at a four-way intersection, or a T intersection, where traffic travelling in a direction of the merging vehicle is commanded to stop via a stop sign or a traffic light. Alternatively, the merging vehicle may be in a stopped position prior to entering the road from a parking lot, driveway, alley, or uncontrolled intersection, where the driver has an option to turn left or turn right on the road in accordance with right-of-way traffic laws. The vehicle may be waiting on an onramp of a highway, preparing to merge between transverse traffic of the highway. In one example, whether the merging vehicle is stopped in a position where the merging vehicle is facing the road is determined based on an output of an onboard navigation system of the merging vehicle (e.g., the navigation system 34 of control system 202 of FIG. 2). In another example, whether the merging vehicle is stopped in a position where the merging vehicle is facing the road is determined based on an output of one or more external sensors and/or cameras of the merging vehicle. In still other examples, the conditions for initiating the selective inhibition routine of the stop-start function of the merging vehicle may not include the merging vehicle being stopped, and may include the merging vehicle approaching an intersection and slowing down, whereby method 300 may be executed while the merging vehicle is still moving. For example, the merging vehicle may slow down when approaching the intersection, and in response to the merging vehicle slowing down, the stop-start controller may initiate an idle-stop routine to turn off the engine when the vehicle stops. However, the merging vehicle may not stop, and may continue into the intersection (e.g., to enter an available traffic window), whereby the selective inhibition routine may be initiated to stop or disable a continuation of the idle-stop routine.

In one example, the conditions for initiating the selective inhibition routine include estimating a probability of the driver making a right or left turn of the merging vehicle, where if the probability is above a threshold probability (e.g., 50%), the conditions for initiating the selective inhibition routine are met, and if the probability is below the threshold probability, the conditions for initiating the selective inhibition routine are not met. For example, if the merging vehicle is stopped at a T intersection where the driver has an option to turn left and an option to turn right, the probability of the driver making a right or left turn of the merging vehicle may be 100%, whereby the conditions for initiating the selective inhibition routine are met. If the merging vehicle is stopped at a four-way intersection where the driver has an option to turn left, an option to turn right, and an option to proceed straight through the intersection, the probability of the driver making a right or left turn of the merging vehicle may be 66%, whereby the conditions for initiating the selective inhibition routine are met. If the merging vehicle is stopped at a crosswalk (e.g., in order to allow a pedestrian to cross the street) where no right turn or left turn options exist, the probability of the driver making a right or left turn of the merging vehicle may be 0%, whereby the conditions for initiating the selective inhibition routine are not met.

In some examples, estimating a probability of the driver making a right or left turn of the vehicle includes consulting a route of the merging vehicle in an onboard navigation system (e.g., the onboard navigation system 34 of control system 202 of FIG. 2). If the route of the merging vehicle includes a right or left turn at the intersection, the probability of the driver making a right or left turn of the merging vehicle is 100%, whereby the conditions for initiating the selective inhibition routine are met. If the route of the merging vehicle proceeds straight through the intersection, the probability of the driver making a right or left turn of the vehicle may be 0%, whereby the conditions for initiating the selective inhibition routine are not met. In other examples, estimating a probability of the driver making a right or left turn of the merging vehicle includes consulting historical driver data of the driver (e.g., from driver data stored in the memory 206 of the controller 12 of control system 202 of FIG. 2, or accessed from an external source), whereby if the intersection lies on a route frequented by the driver in the past, and the route includes turning right or left, the probability of the driver making a right or left turn of the merging vehicle may be estimated based on factors such as a frequency of the driver driving on the route, a time of the driver being stopped at the intersection, etc.

If at 304 the conditions are not met for initiating the selective inhibition routine, method 300 proceeds back to 302, where method 300 includes estimating and/or measuring vehicle operating conditions until conditions are met for initiating the selective inhibition routine. If conditions are met for initiating the selective inhibition routine at 304, method 300 proceeds to 306. At 306, method 300 includes determining whether the driver is turning right. For example, the route of the merging vehicle and/or driver data of the driver may be consulted to determine whether the driver is turning right, as described above at 304. If it is determined at 306 that the driver is not turning right, it may be inferred that the driver is turning left, and method 300 proceeds to 307. At 307, method 300 includes addressing a left-turn scenario. Addressing the left-turn scenario is described below in relation to FIG. 4.

If it is determined at 306 that the driver is turning right, method 300 proceeds to 308. At 308, method 300 includes receiving velocity and location data of transverse traffic approaching from a left side of the merging vehicle (e.g., travelling in a predicted direction of the merging vehicle). For example, if the road is a 2 lane road, the transverse traffic approaching from a left side of the merging vehicle may be approaching in a lane that is nearest the merging vehicle. In one example, the transverse traffic approaching from the left is detected via wireless communication with a V2V network (e.g., the V2V network 13 of FIG. 2), where the controller of the merging vehicle receives velocity and location data of one or more vehicles of the transverse traffic from respective control systems of the one or more vehicles of the transverse traffic (e.g., the control systems 216 of the fleet 250 of FIG. 2). For example, the merging vehicle may receive a first velocity and a first location of a first approaching vehicle, a second velocity and a second location of a second approaching vehicle, and so on. From each velocity and location of each approaching vehicle, the controller of the merging vehicle may estimate a time at which the respective approaching vehicle may reach the merging vehicle.

At 310, method 300 includes estimating an acceleration of the merging vehicle to merge into the transverse traffic, based on a velocity and a spacing of the transverse traffic. Merging into transverse traffic may include turning the merging vehicle (e.g., to the right), and accelerating from a vehicle velocity of 0 (e.g., a stopped position) to a vehicle velocity equal to a velocity of the transverse traffic. In one example, the velocity of the transverse traffic may be a velocity of a lead vehicle of one or more following vehicles of the transverse traffic, where a velocity of each of the one or more following vehicles is approximately equal to the velocity of the lead vehicle. In another example, the transverse traffic includes a single vehicle, and the velocity of the transverse traffic is a velocity of the single vehicle.

Merging into transverse traffic may include accelerating into a space between two vehicles of the transverse traffic (herein, a "traffic window"). In some examples, the traffic window is a space between a first approaching vehicle of the transverse traffic and a location of the merging vehicle. In other examples, the traffic window is a space between the first approaching vehicle and a second approaching vehicle of the transverse traffic. In some examples, the traffic window may be estimated as a length or a distance (e.g., a distance between the first approaching vehicle and the merging vehicle, or a distance between the first approaching vehicle and the second approaching vehicle). For example, at a point in time, the controller may calculate a distance between the first location of the first approaching vehicle received via the V2V network and the second location of the second approaching vehicle received via the V2V network to estimate the traffic window (e.g., a 100-yard window to merge into). The controller may estimate an acceleration distance of the merging vehicle, where the acceleration distance is a distance covered by the merging vehicle while accelerating to the velocity of the first approaching vehicle and the second approaching vehicle (e.g., 30 yards). If the estimated acceleration distance is less than the estimated traffic window, the driver may be able to merge into the traffic window. If the estimated acceleration distance is greater than the estimated traffic window, the driver may not be able to merge into the traffic window.

In other examples, the traffic window may be estimated as a duration (e.g., an estimated time of operation of the merging vehicle until the first approaching vehicle reaches the location of the merging vehicle, or an estimated time of operation of the merging vehicle between an estimated time that the first approaching vehicle passes the location of the merging vehicle and an estimated time that the second approaching vehicle passes the location of the merging vehicle). For example, at a point in time, the controller may calculate a first time of the first approaching vehicle reaching the merging vehicle based on the first location and first velocity received via the V2V network, and a second time of the second approaching vehicle reaching the merging vehicle based on the second location and second velocity received via the V2V network. The controller may calculate a difference between the first time and the second time to estimate the duration of the traffic window (e.g., a 3 second window for merging). The controller may estimate an acceleration duration of the merging vehicle, where the acceleration duration is a time taken by the merging vehicle to accelerate to the velocity of the first approaching vehicle and the second approaching vehicle based on vehicle operating conditions (e.g., 3 seconds). If the estimated acceleration duration is less than the estimated duration of the traffic window, the driver may be able to merge into the traffic window. If the estimated acceleration duration is greater than the estimated duration of the traffic window, the driver may not be able to merge into the traffic window.

In some examples, the controller may estimate the traffic window as a combination of a distance and a duration, or the controller may estimate the traffic window alternatively as a distance or a duration, where how the traffic window is estimated may change dynamically as a function of different factors including a velocity and/or acceleration of the merging vehicle, the velocity of the transverse traffic, one or more conditions of the road, etc.

As an example, the driver may be exiting a parking lot and turning right into transverse traffic. The transverse traffic may include 4 vehicles, where a lead vehicle is followed by three following vehicles traveling at a velocity of the lead vehicle, and where a first traffic window exists between the lead vehicle and a first following vehicle, a second traffic window exists between the first following vehicle and a second following vehicle, and a third traffic window exists between the second following vehicle and a third following vehicle. To merge into the transverse traffic, the driver of the merging vehicle may determine whether one or more of the first traffic window, the second traffic window, or the third traffic window is sufficiently long to allow for an acceleration of the merging vehicle into the respective traffic window.

For example, the first following vehicle may be close to the lead vehicle. The controller may estimate the first traffic window to be 2 seconds, where the controller predicts that the first following vehicle will pass the location of the merging vehicle 2 seconds after the lead vehicle passes the location of the merging vehicle, based on a location and a velocity of the lead vehicle and a location and a velocity of the first following vehicle. The controller may estimate an acceleration duration of the merging vehicle from a stopped position to the velocity of the transverse traffic to be 3 seconds. As a result of the estimated acceleration duration of the merging vehicle being greater than the first traffic window (e.g., 3 greater than 2), the driver may not be able to merge into the first traffic window of the transverse traffic.

The second following vehicle may not be close to the first following vehicle, whereby the controller may estimate the second traffic window to be 5 seconds (e.g., where the controller predicts that the second following vehicle will pass the location of the merging vehicle 5 seconds after the first following vehicle passes the location of the merging vehicle). As a result of the estimated acceleration duration of the merging vehicle of 3 seconds to reach the velocity of the transverse traffic being less than the estimated duration of the second traffic window (e.g., 5 seconds), the driver may be able to merge into the second traffic window of the transverse traffic.

The third following vehicle may be some distance behind the second following vehicle, whereby the controller may estimate the third traffic window to be 100 yards based on a location of the second following vehicle and a location of the third following vehicle received via the V2V network. The controller may estimate an acceleration distance of the merging vehicle to be 20 yards (e.g., the distance covered by the merging vehicle until reaching the velocity of the transverse traffic). As a result of the acceleration distance of the merging vehicle being less than the estimated length of the third traffic window, the driver may be able to merge into the third traffic window of the transverse traffic.

As another example, the transverse traffic may be a single vehicle approaching the location of the merging vehicle, where an initial traffic window exists between a single vehicle and the merging vehicle. The driver may merge into the transverse traffic ahead of the single vehicle (e.g., in the initial traffic window) or behind the single vehicle (e.g., after the transverse traffic passes and the road is clear). If the controller estimates the acceleration distance and/or the acceleration duration of the merging vehicle to be less than the initial traffic window, the driver may be able to merge into the initial traffic window ahead of the single vehicle. If the controller estimates the acceleration distance and/or the acceleration duration of the merging vehicle to be greater than the initial traffic window, the driver may not be able to merge into the initial traffic window ahead of the single vehicle, and may merge into the transverse traffic after the single vehicle passes the merging vehicle.

Figure 5A:
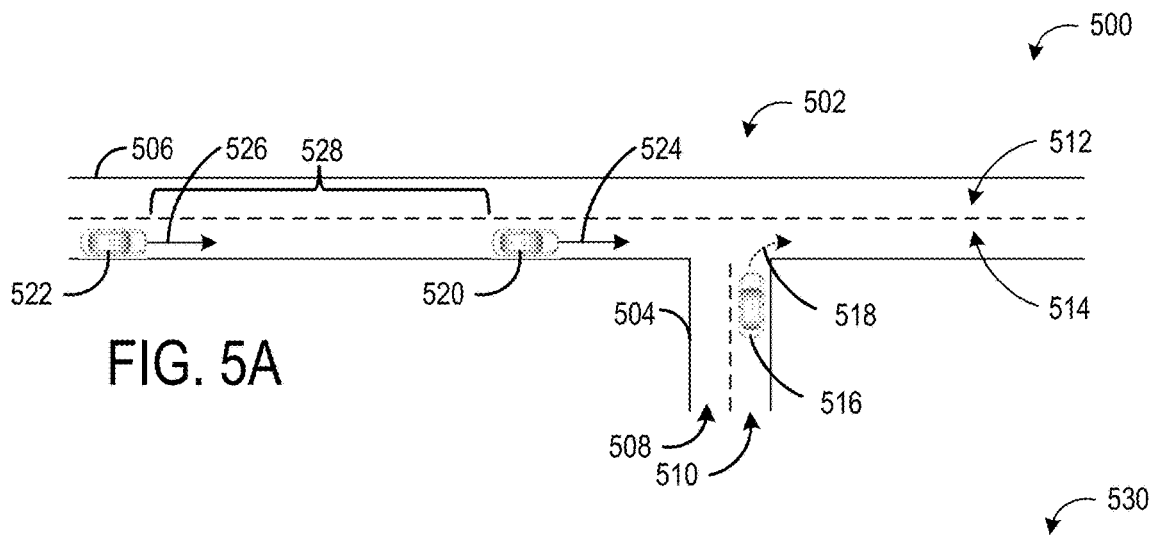
FIGS. 5A, 5B, 5C, and 5D show a sequence of overhead views of a vehicle at an intersection where the vehicle is merging into a traffic window of transverse traffic travelling from left to right.
Figure 5B:
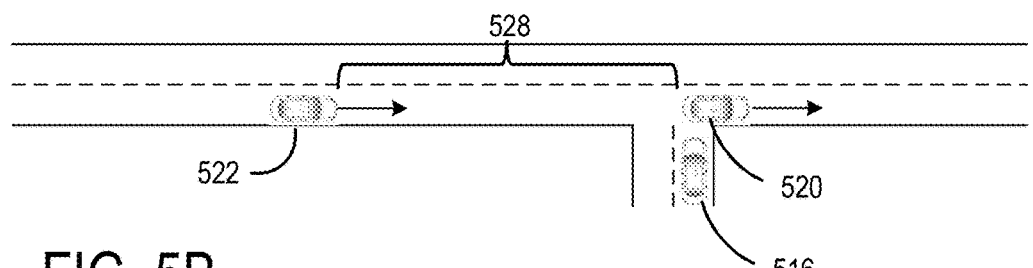
Figure 5C:
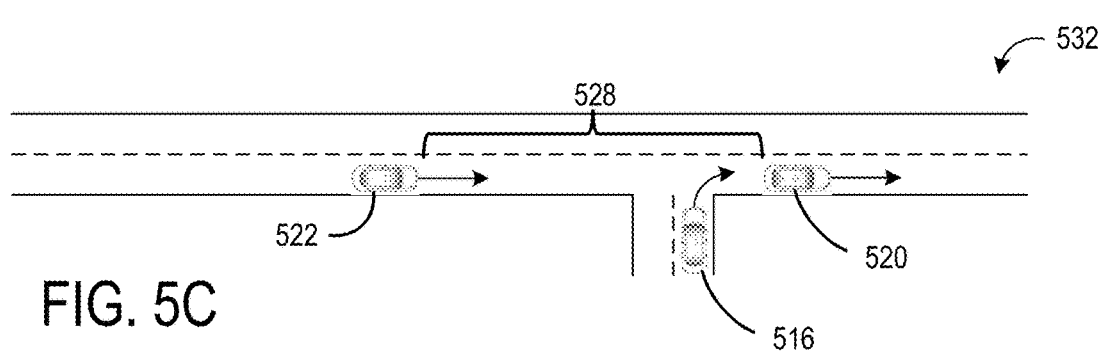
Figure 5D:
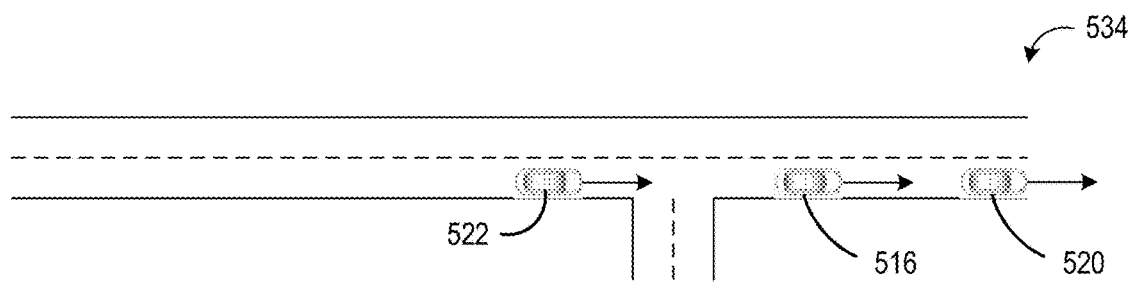

Referring briefly to FIGS. 5A, 5B, 5C, and 5D, a scenario is shown where a vehicle is at an intersection turning right and merging into transverse traffic travelling from a left side of a driver of the vehicle to a right side of the driver of the vehicle, as described above. FIGS. 5A, 5B, 5C, and 5D show a sequence of overhead views of the intersection, where each overhead view shows an arrangement of vehicles in the intersection at a point in time, and where the overhead views occur at a regular time interval t. For example, FIG. 5B shows an arrangement of vehicles in the intersection at the time interval t after FIG. 5A, FIG. 5C shows an arrangement of vehicles in the intersection at the time interval t after FIG. 5B, and FIG. 5D shows an arrangement of vehicles in the intersection at the time interval t after FIG. 5C.

In FIG. 5A, an overhead view 500 shows an intersection 502 where an entering road 504 meets a crossroad 506. The entering road 504 may have a left lane 508 and a right lane 510, and the crossroad 506 may have a left lane 512 and a right lane 514, where right and left are from a point of view of the transverse traffic. A merging vehicle 516 in the right lane 510 of the entering road 504 is preparing to merge from the entering road 504 into the right lane 514 of the crossroad 506, in the intended direction indicated by dotted arrow 518.

Transverse traffic exists in the right lane 514 of the crossroad 506, in the form of a first approaching vehicle 520 travelling in a direction indicated by arrow 524, and a second approaching vehicle 522 travelling in a direction indicated by arrow 526. The a first approaching vehicle 520 and the second approaching vehicle 522 are travelling at a velocity, where a constant distance between the first approaching vehicle 520 and the second approaching vehicle 522 is maintained as the first approaching vehicle 520 and the second approaching vehicle 522 approach the intersection. As a result of the constant distance between the first approaching vehicle 520 and the second approaching vehicle 522, a traffic window 528 exists between the first approaching vehicle 520 and the second approaching vehicle 522. The traffic window 528 is greater than an estimated acceleration duration of the merging vehicle 516, and/or greater than an estimated acceleration distance of the merging vehicle 516, and therefore the merging vehicle 516 can safely merge into the traffic window 528. In FIG. 5B, after the time interval t, an overhead view 530 shows the first approaching vehicle 520 entering the intersection 502 and passing the merging vehicle 516, where the traffic window 528 becomes available for the merging vehicle 516 to turn into. In FIG. 5C, an overhead view 532 shows the merging vehicle turning into the right lane 514 of the crossroad 506, and accelerating into the traffic window 528 between the first approaching vehicle 520 and the second approaching vehicle 522. As the merging acceleration of the merging vehicle 516 is less than the traffic window 528, the merging vehicle 516 has sufficient time and/or distance to merge into the transverse traffic safely. In FIG. 5D, an overhead view 534 shows the merging vehicle 516 after having merged into the traffic window in the right lane 514 of the crossroad 506, where the merging vehicle 516 is between the first approaching vehicle 520 and the second approaching vehicle 522, and the merging vehicle 516 is travelling at the velocity of the first approaching vehicle 520 and the second approaching vehicle 522.

Turning back to FIG. 3, merging into the transverse traffic may cause an anxiety level of the driver to increase. In one example, the anxiety level of the driver is predicted based on a comparison of an estimated merging acceleration rate of the merging vehicle when turning and merging into traffic with a threshold acceleration rate of the driver, where the threshold acceleration rate is an acceleration rate of the merging vehicle when the driver is turning at an intersection when there is no transverse traffic. For example, at an intersection with no transverse traffic, the driver may accelerate while turning right at a first acceleration rate, whereby the first acceleration rate is measured as a change in a velocity of the merging vehicle over a time taken by the merging vehicle to achieve a typical traffic velocity. In one example, the typical traffic velocity is a posted speed limit of the road. In another example, the typical traffic velocity is an average velocity of a plurality of vehicles (e.g., the vehicles 252, 254, 256, and 258 of the fleet 250 of FIG. 2) travelling on the road from historical data. In some examples, the first acceleration rate of the driver (e.g., the threshold acceleration rate) at the intersection may be an average of a plurality of acceleration rates of the driver on a plurality of intersections similar to the intersection. In other examples, the first acceleration rate of the driver at the intersection may be an average of a plurality of acceleration rates of the driver on at the intersection over repeated instances (e.g., if the intersection is on a route frequented by the driver).

Alternatively, when there is transverse traffic at the intersection, the driver may accelerate while turning right at a second acceleration rate, whereby the second acceleration rate is measured as a change in the velocity of the merging vehicle over a time taken by the merging vehicle to merge into the transverse traffic (e.g., the estimated acceleration duration for merging into a traffic window of the transverse traffic). If the second acceleration rate is lower than the first acceleration rate, it may be inferred that merging into the transverse traffic may be no more difficult than turning and accelerating onto the road in a condition of no traffic (e.g., that the driver may not have to accelerate faster than the driver would typically accelerate if there were no traffic). If the second acceleration rate is higher than the first acceleration rate, it may be inferred that merging into the transverse traffic may be more difficult than turning and accelerating onto the road in a condition of no traffic (e.g., that in order to merge, the driver may have to accelerate faster than the driver would typically accelerate if there were no traffic). If it is inferred that merging into the transverse traffic may be more difficult than turning and accelerating onto the road in a condition of no traffic, it may be further inferred that an anxiety level of the driver may increase as a result of anticipating merging into the transverse traffic. If it is inferred that the anxiety level of the driver is increased, the stop-start controller may selectively disable the stop-start function, whereby the engine of the merging vehicle is not turned off while the merging vehicle is stopped and idling prior to executing a turn. Thus, the stop-start function may be selectively enabled or disabled based on a predicted anxiety of the driver, where the predicted anxiety of the driver is based on the second acceleration rate being below a threshold acceleration rate, the threshold rate defined by a threshold acceleration rate estimated from historical data.

At 312, method 300 includes determining whether the estimated merging acceleration rate for merging into transverse traffic is above the threshold acceleration rate. If it is determined at 312 that the estimated merging acceleration rate for merging into transverse traffic is above the threshold acceleration rate, it is inferred that the driver may have an increased level of anxiety, and method 300 proceeds to 316. At 316, method 300 includes starting the engine of the merging vehicle if the engine is off (e.g., while the driver still has a foot on a brake pedal of the vehicle and prior to accelerating). By starting the engine, the increased level of anxiety of the driver may be reduced. For example, a contributing factor of the increased level of anxiety of the driver may be a concern that the engine of the merging vehicle will not be able to start on demand after an idle-stop event. By turning the engine on, the concern that the engine of the merging vehicle will not be able to start on demand may be alleviated, thereby reducing the level of anxiety of the driver.

In some examples, the stop-start controller may not have turned the engine off yet, whereby the engine may already be on at 316. For example, the conditions for initiating the selective inhibition routine may not include the vehicle being in a stopped condition, whereby method 300 may be executed prior to the vehicle stopping (e.g., as the vehicle is approaching an intersection).

If at 312 it is determined that the estimated merging acceleration rate for merging into transverse traffic is below the threshold acceleration rate, method 300 proceeds to 314. At 314, method 300 includes determining whether the merging vehicle is at a traffic light. In one example, determining whether the merging vehicle is at a traffic light includes detecting a signal of the traffic light via a V2X network (e.g., the V2X network 15 of FIG. 2). For example, the signal of the traffic light may be automatically received by the merging vehicle when the merging vehicle is within a threshold distance (e.g., 100 yards) of the traffic light, or the controller of the merging vehicle may request or search for a traffic light signal based on a velocity of the merging vehicle decreasing below a threshold (e.g., 10 mph), or based on an output of one or more different sensors of the merging vehicle. In other examples, determining whether the merging vehicle is at a traffic light includes detecting the traffic light via an external camera of the merging vehicle, where the traffic light is identified in an image acquired by the external camera via a machine learning algorithm. It should be appreciated that the examples provided herein are for illustrative purposes, and other methods of determining whether the merging vehicle is at a traffic light may be included without departing from the scope of this disclosure.

If the merging vehicle is at a traffic light, the merging vehicle may receive traffic light data from a control system of the traffic light (e.g., the control system 272 of the traffic lights 260 of FIG. 2) via the V2X network. As described above in relation to FIG. 2, the traffic light data may include a state of the traffic light (e.g., red, yellow, green), a duration of the state of the traffic light (e.g., 30 seconds), a timing of the traffic light (e.g., a time remaining until the traffic light changes), one or more upcoming states and durations of states of the traffic light, and so forth. If at 314 it is determined that the vehicle is at a traffic light, method 300 proceeds to 320. At 320, method 300 includes scheduling an engine start based on the traffic light data. For example, the traffic light data may indicate that a signal of the traffic light will change from red to green within a duration of 20 seconds, whereby the controller may schedule an engine start in 20 seconds, so that the engine is turned on prior to the traffic light changing from a red signal to a green signal. As a result of timing the scheduling of the engine start with the change of the traffic light, an efficiency of an engine stop-start function may be maximized.

Alternatively, if at 314 it is determined that the merging vehicle is not at a traffic light, method 300 proceeds to 318. At 318, method 300 includes scheduling the engine start based on a pedal position of the merging vehicle. In one example, a change in a position of a brake pedal from an engaged position to a disengaged position indicates an intention of the driver to initiate operation of the merging vehicle. In response to the indication that the driver intends to initiate operation of the merging vehicle, the controller and/or the stop-start controller of the merging vehicle may turn the engine on to provide power to the merging vehicle for vehicle operation. In another example, a change in a position of an accelerator pedal from a disengaged position to an engaged position indicates an intention of the driver to initiate operation of the merging vehicle. In response to the indication that the driver intends to initiate operation of the merging vehicle, the controller and/or the stop-start controller of the merging vehicle may turn the engine on to provide power to the merging vehicle for vehicle operation.

In some examples the engine start may be scheduled for a time prior to initiating vehicle operation. For example, if the traffic light data indicates that a signal of the traffic light will change from red to green within a duration of 20 seconds, the controller may schedule an engine start in 18 seconds rather than 20 seconds, to provide a reassurance in advance to the driver that the vehicle is ready to accelerate (e.g., to provide a 2 second advance notice). Further, the advance notice may be adjusted based on a predicted anxiety level of the driver, whereby if an increased level of anxiety of the driver is predicted (e.g., as a result of having to merge into a traffic window of the transverse traffic), the time of the advance notice may be increased to provide an increased reassurance to the driver. Alternatively, if an increased level of anxiety of the driver is not predicted (e.g., as a result of not having to merge into a traffic window of the transverse traffic), the advance notice may be decreased to increase a fuel efficiency of the merging vehicle.

Referring now to FIG. 4, an exemplary method 400 shows a procedure for determining whether to selectively disable an engine stop-start function of a merging vehicle, such as the vehicle 5 of FIG. 1, when merging into traffic during a left turn. Method 400 may be carried out as a part of method 300 of FIG. 3.

At 402, method 400 includes determining whether the vehicle is at a traffic light, for example, by receiving a signal of the traffic light as described above in relation to FIG. 3. If it is determined at 402 that the vehicle is at a traffic light, method 400 proceeds to 404. At 404, method 400 includes scheduling an engine start based on data received from the traffic light, as described above in relation to step 320 of FIG. 3. If it is determined at 402 that the vehicle is not at a traffic light, method 400 proceeds to 406.

At 406, method 400 includes receiving velocity and location data of transverse traffic approaching from a left side of the merging vehicle (e.g., travelling in an opposite direction of predicted direction of the merging vehicle), and transverse traffic approaching from a right side of the merging vehicle (e.g., travelling in the predicted direction of the merging vehicle). For example, the road may be a 2 lane road, where the transverse traffic approaching from the left side of the merging vehicle may be in a first lane that is nearest the merging vehicle, and the transverse traffic approaching from the right side of the merging vehicle may be in a second lane that is farthest from the merging vehicle. To merge into the transverse traffic when making a left turn, the merging vehicle passes through the first lane that is nearest the merging vehicle, and merges into the second lane that is farthest from the merging vehicle. As described above, the transverse traffic approaching from the left and from the right may be detected via wireless communication with a V2V network, where the controller of the merging vehicle receives velocity and location data of one or more vehicles of the transverse traffic from respective controllers of the one or more vehicles of the transverse traffic.

At 408, method 400 includes estimating an acceleration of the merging vehicle to merge into the transverse traffic of the second lane, based on a velocity and a spacing of the transverse traffic. Merging into transverse traffic may include turning the merging vehicle to the left, and accelerating from a vehicle velocity of 0 (e.g., a stopped position) to a vehicle velocity equal to a velocity of the transverse traffic of the second lane. In one example, the velocity of the transverse traffic may be a velocity of a lead vehicle of one or more following vehicles of the transverse traffic, where a velocity of each of the one or more following vehicles is approximately equal to the velocity of the lead vehicle. In another example, the transverse traffic includes a single vehicle, and the velocity of the transverse traffic may be a velocity of the single vehicle.

Merging into transverse traffic of the second lane may include accelerating into a traffic window of the transverse traffic, as described above in reference to FIG. 3. For example, at a point in time, the controller may estimate the traffic window, and an acceleration distance and/or acceleration duration of the merging vehicle to merge into the transverse traffic. Based on the acceleration distance and/or acceleration duration of the merging vehicle and the traffic window, the controller may determine whether the traffic window is sufficiently long for the merging vehicle to merge into.

Additionally, merging into the transverse traffic of the second lane may also include accelerating through a traffic window of the transverse traffic of the first lane. In other words, the traffic window for merging into the transverse traffic of the second lane may be a combination of a traffic window in a first direction (e.g., first lane) and a traffic window in a second direction (e.g., second lane). For example, the transverse traffic may include a plurality of vehicles traveling in the first direction and a plurality of vehicles traveling in the second direction, where the driver wishes to turn the merging vehicle left into the transverse traffic (e.g., in the second direction, in the second lane). The controller may estimate a velocity of the transverse traffic in the second direction and determine whether a second direction traffic window of the transverse traffic is sufficiently long to merge into, and the controller may estimate a velocity of the transverse traffic in the first direction and determine whether a first direction traffic window of the transverse traffic is sufficiently long to accelerate through. The controller may estimate whether a combined traffic window, comprising an overlap of the first direction traffic window and the second direction traffic window, is sufficiently long to allow the merging vehicle to merge into the transverse traffic in the second direction (e.g., where the acceleration duration and/or acceleration distance of the merging vehicle is less than the combined traffic window).

Figure 6A:
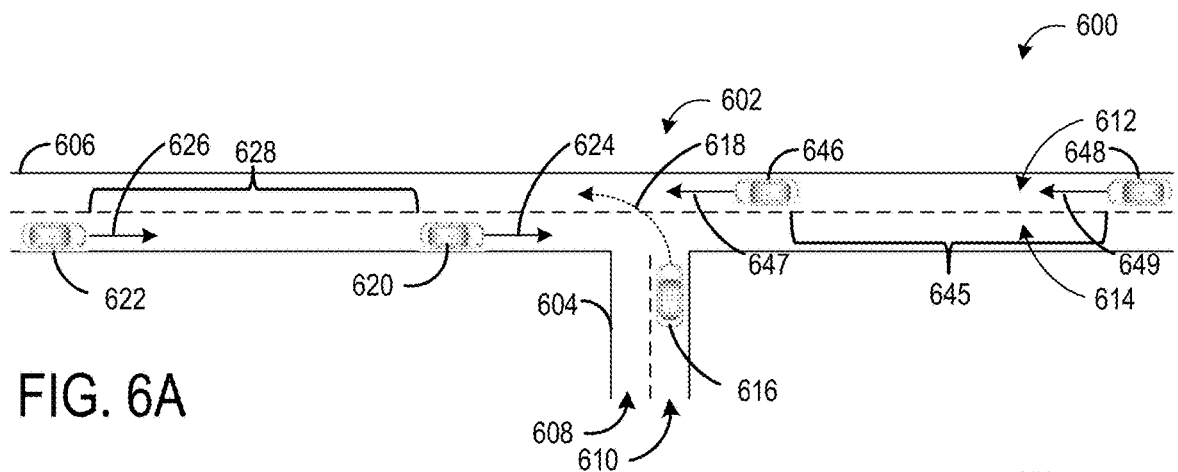
FIGS. 6A, 6B, 6C, and 6D show a sequence of overhead views of a vehicle at an intersection where the vehicle is merging into a traffic window of transverse traffic travelling from right to left.
Figure 6B:
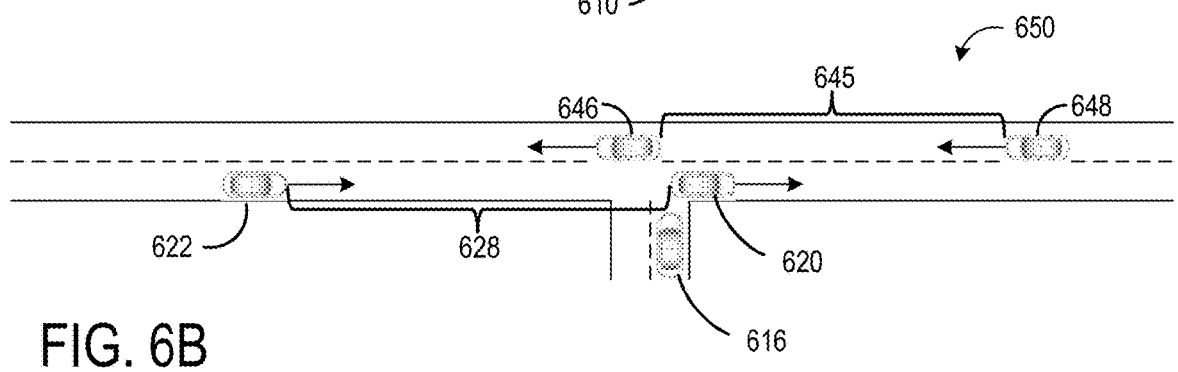
Figure 6C:
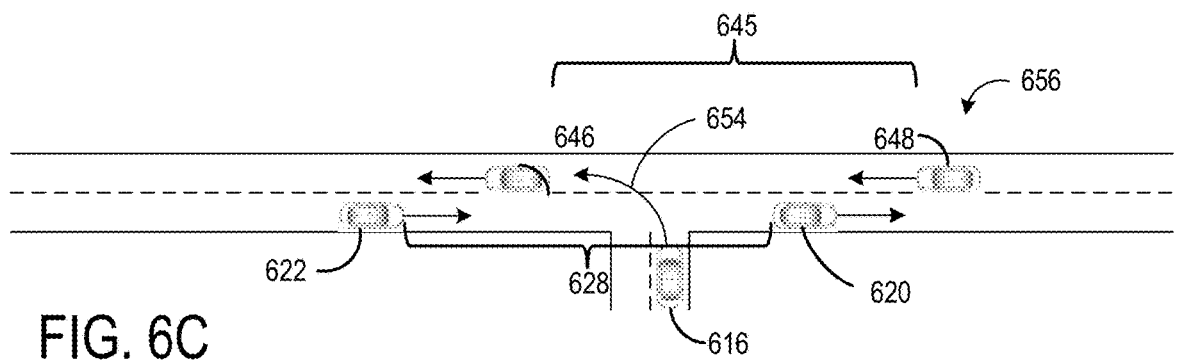
Figure 6D:
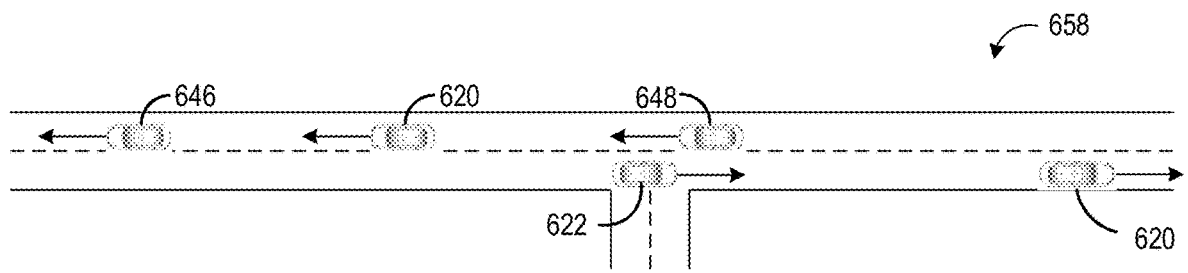

Referring briefly to FIGS. 6A, 6B, 6C, and 6D, a scenario is shown where a vehicle is at an intersection turning left and merging into transverse traffic travelling from a right side of a driver of the vehicle to a left side of the driver of the vehicle, as described above. FIGS. 6A, 6B, 6C, and 6D show a sequence of overhead views of the intersection, where each overhead view shows an arrangement of vehicles in the intersection at a point in time, and where the overhead views occur at a regular time interval t. For example, FIG. 6B shows an arrangement of vehicles in the intersection at the time interval t after FIG. 6A, FIG. 6C shows an arrangement of vehicles in the intersection at the time interval t after FIG. 6B, and FIG. 6D shows an arrangement of vehicles in the intersection at the time interval t after FIG. 6C.

In FIG. 6A, an overhead view 600 shows an intersection 602 where an entering road 604 meets a crossroad 606. The entering road 604 may have a left lane 608 and a right lane 610, and the crossroad 606 may have a merging traffic lane 612 and a pass-through traffic lane 614. A merging vehicle 616 in the right lane 610 of the entering road 604 is preparing to merge from the entering road 604 into the merging traffic lane 612 of the crossroad 606, in the intended direction indicated by dotted arrow 618 (e.g., to the left). Transverse traffic exists in the pass-through traffic lane 614 of the crossroad 606, in the form of a first left approaching vehicle 620 travelling in a direction indicated by arrow 624, and a second left approaching vehicle 622 travelling in a direction indicated by arrow 626. The first left approaching vehicle 620 and the second left approaching vehicle 622 are travelling at a first velocity, where a constant distance between the first left approaching vehicle 620 and the second left approaching vehicle 622 is maintained as the first left approaching vehicle 620 and the second left approaching vehicle 622 approach the intersection. As a result of the constant distance between the first left approaching vehicle 620 and the second left approaching vehicle 622, a first traffic window 628 exists between the first left approaching vehicle 620 and the second left approaching vehicle 622, through which the merging vehicle 616 can pass in order to merge into the merging traffic lane 612 of the crossroad 606.

Transverse traffic also exists in the merging traffic lane 612 of the crossroad 606, in the form of a first right approaching vehicle 646 travelling in a direction indicated by arrow 647, and a second right approaching vehicle 648 travelling in a direction indicated by arrow 649. The first right approaching vehicle 646 and the second right approaching vehicle 647 are travelling at a second velocity, where a constant distance between the first right approaching vehicle 646 and the second right approaching vehicle 648 is maintained as the first right approaching vehicle 646 and the second right approaching vehicle 648 approach the intersection. As a result of the constant distance between the first right approaching vehicle 646 and the second right approaching vehicle 648, a second traffic window 645 exists between the first right approaching vehicle 646 and the second right approaching vehicle 648, into which the merging vehicle 616 can merge into the merging traffic lane 612 of the crossroad 606.

In FIG. 6B, an overhead view 650 shows, after the time interval t, the first left approaching vehicle 620 entering the intersection 602 and passing the merging vehicle 616, where the first traffic window 628 opens for the merging vehicle 616 to drive through, whereby the merging vehicle 616 may pass between the first left approaching vehicle 620 and the second left approaching vehicle 622 in order to merge into the merging traffic lane 612 of the crossroad 606. Similarly, the first right approaching vehicle 646 is entering the intersection 602 and passing the merging vehicle 616, where the second traffic window 645 opens for the merging vehicle 616 to merge into, after passing through the first traffic window 628. The second traffic window 645 is greater than an estimated acceleration duration of the merging vehicle 616 and/or greater than an estimated acceleration distance of the merging vehicle 616, and therefore the merging vehicle 616 can safely merge into the traffic window 645. In FIG. 6C, an overhead view 656 shows the merging vehicle turning and accelerating through the first traffic window 628 of the pass-through traffic lane 614 of the crossroad 606, and merging into the second traffic window 645 of the merging traffic lane 612, between the first right approaching vehicle 646 and the second right approaching vehicle 648.

As the merging acceleration of the merging vehicle 616 is less than the second traffic window 645, the merging vehicle 616 has sufficient time and/or distance to merge into the transverse traffic of the merging traffic lane 612 of the crossroad 606 safely. Further, as the merging acceleration of the merging vehicle 616 is less than the first traffic window 628, the merging vehicle 616 has sufficient time to pass through the transverse traffic of the pass-through traffic lane 614 of the crossroad 606 safely. In FIG. 6D, an overhead view 658 shows the merging vehicle 616 after having merged into the second traffic window 645 in the transverse traffic of the merging traffic lane 612 of the crossroad 606, where the merging vehicle 616 is between the first right approaching vehicle 646 and the second right approaching vehicle 648, and the merging vehicle 616 is travelling at the second velocity of the first right approaching vehicle 646 and the second right approaching vehicle 648.

Turning back to FIG. 4, at 410, method 400 includes determining whether the estimated merging acceleration rate for merging into transverse traffic is above the threshold acceleration rate of the driver, as described above in reference to FIG. 3. If it is determined at 410 that the estimated merging acceleration rate for merging into transverse traffic of the second lane is above the threshold acceleration rate, it is inferred that the driver may have an increased level of anxiety, and method 400 proceeds to 412. At 412, method 400 includes starting the engine of the merging vehicle if the engine is off, thereby reducing the increased level of anxiety of the driver by alleviating any concern that the engine might not start on demand. If the engine is not off, then at 412, method 400 includes maintaining the engine in operation. Alternatively, if at 410 it is determined that the estimated merging acceleration rate for merging into transverse traffic of the second lane is below the threshold acceleration rate, method 400 proceeds to 414. At 414, method 400 includes scheduling the engine start based on a pedal position of the vehicle, to turn the engine on to provide power to the merging vehicle for the turn.

FIG. 7A shows a sequence of events 700 that illustrates a first scenario of a vehicle merging into transverse traffic in one direction, travelling from a left side of a driver of the vehicle to a right side of the driver, at an intersection. The horizontal (x-axis) denotes time and the vertical lines t1-t4 identify significant times in the sequence of events 700.

The sequence of events 700 includes four plots. The first plot, line 702, shows a velocity of the vehicle as the vehicle approaches the intersection, stops, turns to the right, and merges into the transverse traffic. The velocity may range from 0 miles per hour (MPH) to a velocity of the transverse traffic. For example, the velocity of the transverse traffic may be at or around a posted speed limit for a road of the intersection, or at an appropriate velocity for operating the vehicle based on road, climate, congestion, and other conditions. The second plot, line 704, shows the presence of a traffic window into which the vehicle can safely merge. For the purposes of this disclosure, the vehicle can safely merge if an estimated merging acceleration of the vehicle is less than the traffic window, such that the vehicle can merge into the traffic window without hitting a vehicle of the transverse traffic, or causing a approaching vehicle of the transverse traffic to hit the vehicle, or causing the approaching vehicle of the transverse traffic to brake to reduce a velocity of the approaching vehicle. The third plot, line 706, shows an anxiety level of the driver. For example, the anxiety level of the driver may be low if a stressful situation is not encountered, or the anxiety level of the driver may be high if a stressful situation is encountered. An example of a stressful situation is a merge scenario where the driver may have to accelerate quickly in order to merge into a traffic window. The fourth plot, line 706, shows a state of an engine of the vehicle. For example, the state of the engine may be ON, whereby the engine is either propelling the vehicle or idling, or the state of the engine may be OFF, whereby the engine is not propelling the vehicle or idling.

At time t0, the vehicle is approaching the intersection, travelling at a velocity of traffic (e.g., similar to a velocity of the transverse traffic as described above), as shown by line 702. Transverse traffic at the intersection may be constant, whereby no traffic windows are open to turn and merge into, as shown by line 704. The engine is on, as indicated by line 706, and an anxiety level of the driver is low, as no stressful situation is present.

Between time t0 and t1, line 702 shows the velocity of the vehicle decreasing as the vehicle slows down in anticipation of a stop at the intersection (e.g., at a stop sign). As the driver approaches the intersection, the driver does not experience an increased anxiety in anticipation of merging into the transverse traffic, as shown by line 706. For example, the transverse traffic may not be congested, where there are a plurality of traffic windows for the driver to merge into, and/or one or more traffic windows of the plurality of traffic windows may be long, where the driver may not have to accelerate at a faster rate than threshold acceleration rate in order to perform the merge. At time t1, the velocity of the vehicle reaches 0 MPH, when the vehicle stops. As a result of the driver not experiencing an increased anxiety, when the vehicle stops, the stop-start controller of the vehicle turns off the engine to save fuel and reduce emissions, as shown by line 708.

Between time t1 and t2, the driver of the vehicle monitors the transverse traffic approaching from the left side of the driver for traffic windows for the vehicle to merge into. At time t2, a traffic window opens in the transverse traffic as shown by line 704, whereby the driver has an opportunity to merge into the transverse traffic. The driver initiates operation of the vehicle (e.g., by taking a foot off of a brake pedal of the vehicle and pressing an accelerator pedal of the vehicle), and upon the vehicle initiating operation, the engine turns on to power the vehicle, as shown by line 708.

Between time t2 and t3, the vehicle accelerates as it turns into the traffic window, and the velocity of the vehicle increases as shown by line 702. At time t3, the vehicle reaches velocity of the transverse traffic, where after time t3 the velocity of the vehicle remains constant as the vehicle continues travelling in a direction of the transverse traffic.

Figure 7B:
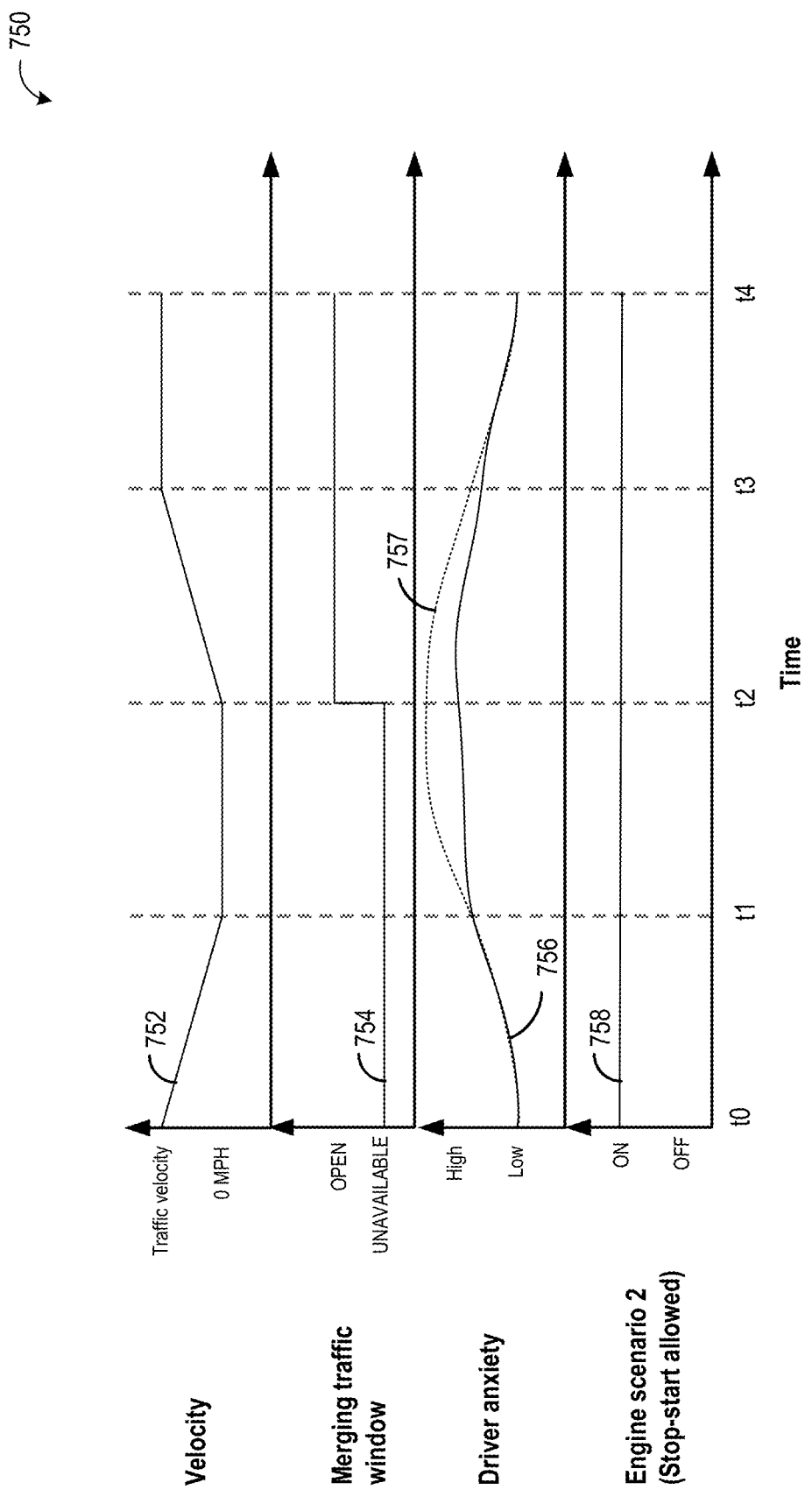
FIG. 7B is a timing diagram that shows a sequence of events as a vehicle merges into a right lane of transverse traffic in a high anxiety scenario.
Figure 8A:
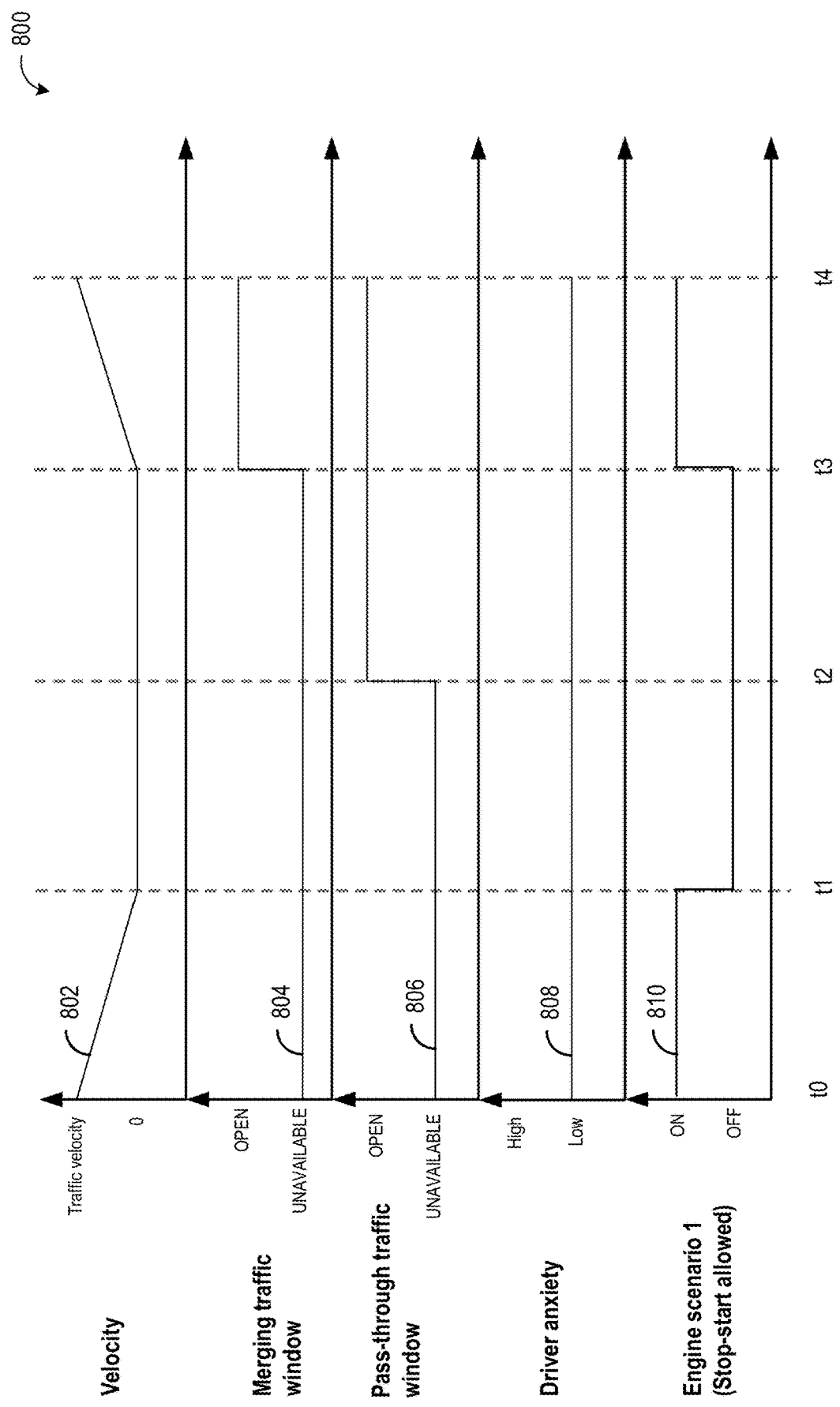
FIG. 8A is a timing diagram that shows a sequence of events as a vehicle merges into a left lane of transverse traffic in a low-anxiety scenario.
Figure 8B:
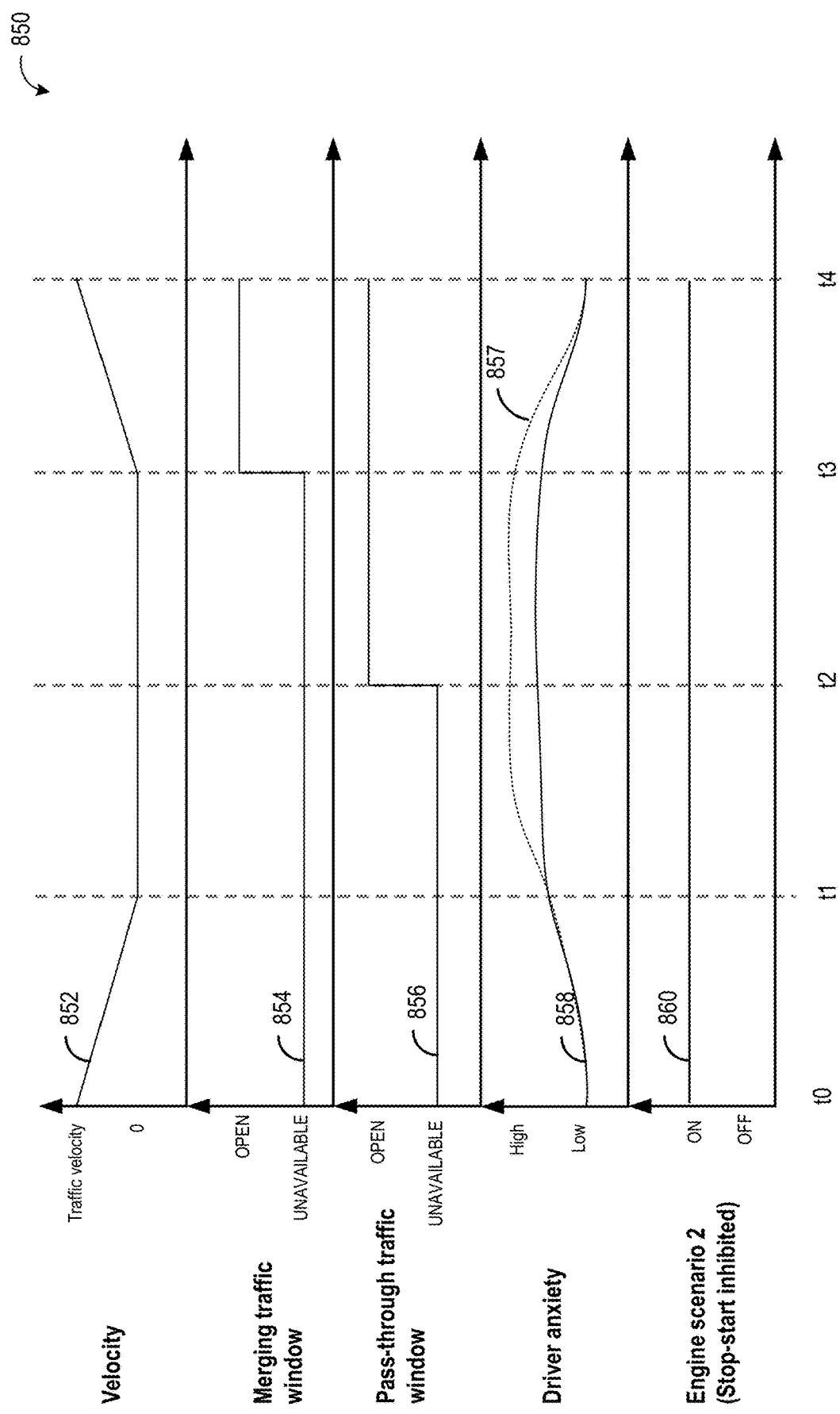
FIG. 8B is a timing diagram that shows a sequence of events as a vehicle merges into a left lane of transverse traffic in a high-anxiety scenario.

Referring now to FIG. 7B, a sequence of events 750 is shown that illustrates a second scenario of the vehicle merging into the transverse traffic of FIG. 7A, where the engine is not turned off by the stop-start controller during a stop-idle event.

The sequence of events 750 also includes four plots. the first plot, line 752, shows a velocity of the vehicle as the vehicle, the second plot, line 754, shows the presence of a traffic window into which the vehicle can safely merge, the third plot, line 756, shows an anxiety level of the driver, and the fourth plot, line 758, shows the state of an engine of the vehicle (e.g., ON or OFF), as in FIG. 7A.

At time t0, the vehicle is approaching the intersection, travelling at a velocity of traffic as shown by line 752. Transverse traffic at the intersection may be constant, whereby no traffic windows are open to turn and merge into, as shown by line 754. The engine is on, as indicated by line 758.

Between time t0 and t1, line 752 shows the velocity of the vehicle decreasing as the vehicle slows down in anticipation of a stop at the intersection (e.g., at a stop sign). In this scenario, as the driver approaches the intersection, the driver experiences an increased anxiety in anticipation of merging into the transverse traffic. For example, the transverse traffic may be congested, where few traffic windows exist for the driver to merge into, and/or the traffic windows may be short, where the driver may have to accelerate at a faster rate than a threshold acceleration rate if no transverse traffic were present. At time t1, the velocity of the vehicle reaches 0 MPH, when the vehicle stops. As a result of the driver experiencing an increased anxiety, when the vehicle stops, the stop-start function of the vehicle is disabled, whereby the engine is not turned off to save fuel and reduce emissions, as shown by line 758. As a result of the engine not being turned off, an anxiety level of the driver is reduced by eliminating an anxiety due to a concern that the engine might not turn on when a merge is initiated. For example, a line 757 shows a hypothetical level of anxiety that the driver might have experienced, if the engine were turned off at t1 (e.g., as seen in FIG. 7A), where the hypothetical level of anxiety of the driver shown by line 758 is higher than the level of anxiety of the driver shown by line 757.

Between time t1 and t2, the driver of the vehicle monitors the transverse traffic approaching from the left side of the driver for traffic windows for the vehicle to merge into. At time t2, a traffic window opens in the transverse traffic as shown by line 754, whereby the driver has an opportunity to merge into the transverse traffic. The driver turns into the traffic window in order to merge into the transverse traffic.

Between time t2 and t3, the vehicle accelerates into the traffic window opened at t2, and the velocity of the vehicle increases as shown by line 752. As the vehicle merges into the traffic window, the level of anxiety of the driver decreases. At time t3, the vehicle reaches velocity of the transverse traffic, where after time t3 the velocity of the vehicle remains constant as the vehicle continues travelling in a direction of the transverse traffic. At time t4, the anxiety level of the driver is low (e.g., normal).

Turning now to FIG. 8A, a sequence of events 800 is shown that illustrates a first scenario of a vehicle passing through a first transverse traffic in a first direction, travelling from a left side of a driver of the vehicle to a right side of the driver, and merging into a second transverse traffic in a second direction, travelling from the right side of the driver to the left side of the driver, at an intersection. The horizontal (x-axis) denotes time and the vertical lines t1-t4 identify significant times in the sequence of events 800.

The sequence of events 800 includes five plots. The first plot, line 802, shows a velocity of the vehicle as the vehicle approaches the intersection, stops, turns to the left, and merges into the second transverse traffic. The velocity may range from 0 miles per hour (MPH) to a velocity of the second transverse traffic. The second plot, line 804, shows the presence of a merging traffic window into which the vehicle can safely merge (e.g., where an estimated merging acceleration is less than a merging traffic window, such that the vehicle can merge into the merging traffic window without hitting a vehicle of the second transverse traffic, or causing a approaching vehicle of the second transverse traffic to hit the vehicle, or causing the approaching vehicle of the second transverse traffic to brake to reduce a velocity of the approaching vehicle of the second transverse traffic). The third plot, line 806, shows the presence of a pass-through traffic window through which the vehicle can safely pass (e.g., where the vehicle can pass through the pass-through traffic window without hitting a vehicle of the first transverse traffic, or causing a approaching vehicle of the first transverse traffic to hit the vehicle, or causing the approaching vehicle of the first transverse traffic to brake to reduce a velocity of the approaching vehicle of the first transverse traffic. The fourth plot, line 808, shows an anxiety level of the driver. For example, the anxiety level of the driver may be low, if a stressful situation is not encountered, or the anxiety level of the driver may be high, if a stressful situation is encountered. The fifth plot, line 810, shows a state of an engine of the vehicle. For example, the state of the engine may be ON, whereby the engine is either propelling the vehicle or idling, or the state of the engine may be OFF, whereby the engine is not propelling the vehicle or idling.

At time t0, the vehicle is approaching the intersection, travelling at a velocity of traffic (e.g., similar to a velocity of the transverse traffic as described above) as shown by line 802. The first transverse traffic in the first direction and the second transverse traffic in the second direction may be constant, whereby no traffic windows are open to pass through or merge into, as shown by lines 804 and 806. The engine is on, as indicated by line 810, and an anxiety level of the driver is low, as shown by line 808, as no stressful situation is present.

Between time t0 and t1, line 802 shows the velocity of the vehicle decreasing as the vehicle slows down in anticipation of a stop at the intersection (e.g., at a stop sign). As the driver approaches the intersection, the driver does not experience an increased anxiety in anticipation of merging into through the first transverse traffic, and into the second transverse traffic, as shown by line 808. For example, the first transverse traffic and the second transverse traffic may not be congested, where a there are plurality of traffic windows for the driver to pass through and merge into respectively, and/or one or more traffic windows of the plurality of traffic windows may be long, where the driver may not have to accelerate at a faster rate than threshold acceleration rate in order to perform the merge. At time t1, the velocity of the vehicle reaches 0 MPH, when the vehicle stops. As a result of the driver not experiencing an increased anxiety, when the vehicle stops, the stop-start controller of the vehicle turns off the engine to save fuel and reduce emissions, as shown by line 810.

Between time t1 and t2, the driver of the vehicle monitors the first transverse traffic approaching from the left side of the driver for pass-through traffic windows for the vehicle to pass through. At time t2, a pass-through traffic window opens in the first transverse traffic as shown by line 806, whereby the driver has an opportunity to pass through the first transverse traffic. However, a merging traffic window in the second transverse traffic is unavailable, as shown by line 804, whereby the driver does not have an opportunity to merge into the second transverse traffic.

Between time t2 and t3, the driver continues to monitor the second transverse traffic approaching from the right side of the driver for merging traffic windows for the vehicle to merge into. At time t3, a merging traffic window opens in the second transverse traffic, as shown by line 804, whereby the driver has an opportunity to merge into the second transverse traffic. The driver initiates operation of the vehicle (e.g., by taking a foot off of a brake pedal of the vehicle and pressing an accelerator pedal of the vehicle), and upon the vehicle initiating operation, the engine turns on to power the vehicle, as shown by line 810. The driver turns and passes through the pass-through traffic window in order to merge into the merging traffic window of the second transverse traffic.

Between time t3 and t4, the vehicle accelerates as it turns into the merging traffic window opened at t3, and the velocity of the vehicle increases as shown by line 852. At time t4, the vehicle reaches the velocity of the second transverse traffic.

Between time t3 and t4, the vehicle accelerates as it turns into the merging traffic window opened at t3, and the velocity of the vehicle increases as shown by line 802. At time t4, the vehicle reaches velocity of the merging transverse traffic.

FIG. 8B shows a sequence of events 850 at the intersection of FIG. 8A that illustrates a second scenario of a vehicle passing through a first transverse traffic in a first direction, travelling from a left side of a driver of the vehicle to a right side of the driver, and merging into a second transverse traffic in a second direction, travelling from the right side of the driver to the left side of the driver, at an intersection. The horizontal (x-axis) denotes time and the vertical lines t1-t4 identify significant times in the sequence of events 800.

The sequence of events 800 includes five plots. As with FIG. 8A, the first plot, line 852, shows a velocity of the vehicle; the second plot, line 854, shows the presence of a merging traffic window into which the vehicle can safely merge; the third plot, line 856, shows the presence of a pass-through traffic window through which the vehicle can safely pass; the fourth plot, line 858, shows an anxiety level of the driver; and the fifth plot, line 860, shows a state of an engine of the vehicle. For example, the state of the engine may be ON, whereby the engine is either propelling the vehicle or idling, or the state of the engine may be OFF, whereby the engine is not propelling the vehicle or idling.

At time t0, the vehicle is approaching the intersection, travelling at a velocity of traffic (e.g., similar to a velocity of the transverse traffic as described above) as shown by line 852. The first transverse traffic in the first direction and the second transverse traffic in the second direction may be constant, whereby no traffic windows are open to turn and merge into, as shown by lines 854 and 856. The engine is on, as indicated by line 860, and an anxiety level of the driver is low as shown by line 858, as no stressful situation is present.

Between time t0 and t1, line 852 shows the velocity of the vehicle decreasing as the vehicle slows down in anticipation of a stop at the intersection. As the driver approaches the intersection, in this scenario the driver experiences an increased anxiety in anticipation of merging through the first transverse traffic, and into the second transverse traffic, as shown by line 858. For example, the first transverse traffic and the second transverse traffic may be congested, where few traffic windows exist for the driver to pass through and merge into respectively, and the traffic windows may be short, where the driver may have to accelerate at a faster rate than threshold acceleration rate in order to perform the merge. At time t1, the velocity of the vehicle reaches 0 MPH, when the vehicle stops. As a result of the driver experiencing an increased anxiety, when the vehicle stops, the stop-start function of the vehicle is disabled, whereby the engine is not turned off to save fuel and reduce emissions, as shown by line 858. As a result of the engine not being turned off, an anxiety level of the driver is reduced, in particular, by eliminating an anxiety due to a concern that the engine might not turn on when a merge is initiated. For example, a line 857 shows a hypothetical level of anxiety that the driver might have experienced if the engine were turned off at t1 (e.g., as seen in FIG. 8A), where the hypothetical level of anxiety of the driver shown by line 858 is higher than the level of anxiety of the driver shown by line 857.

Between time t1 and t2, the driver of the vehicle monitors the first transverse traffic approaching from the left side of the driver for pass-through traffic windows for the vehicle to pass through. At time t2, a pass-through traffic window opens in the first transverse traffic as shown by line 856, whereby the driver has an opportunity to pass through the first transverse traffic. However, a merging traffic window in the second transverse traffic is unavailable, as shown by line 854, whereby the driver does not have an opportunity to merge into the second transverse traffic.

Between time t2 and t3, the driver continues to monitor the second transverse traffic approaching from the right side of the driver for merging traffic windows for the vehicle to merge into. At time t3, a merging traffic window opens in the second transverse traffic, as shown by line 854, whereby the driver has an opportunity to merge into the second transverse traffic. The driver turns and passes through the pass-through traffic window in order to merge into the merging traffic window of the second transverse traffic.

Between time t3 and t4, the vehicle accelerates as it turns into the merging traffic window opened at t3, and the velocity of the vehicle increases as shown by line 852. At time t4, the vehicle reaches the velocity of the second transverse traffic.

Thus, an example method is provided for selectively disabling a stop-start function of a vehicle, based on a predicted level of anxiety of a driver of the vehicle when at an intersection and facing a merge scenario into transverse traffic. If an increased level of anxiety is predicted, a stop-start function of the vehicle may be disabled in response to the increased level of anxiety. By disabling the stop-start function, the increased level of anxiety may be reduced by alleviating a concern of the driver that an engine of the vehicle might not start on demand. Alternatively, if an increased level of anxiety is not predicted, the stop-start function of the vehicle may not be disabled, whereby the engine may be turned off while the vehicle is stopped at the intersection, thereby reducing emissions and increasing a fuel efficiency of the vehicle. In one example, the level of anxiety of the driver may be predicted by estimating a merging acceleration rate of the vehicle to merge into a traffic window of the transverse traffic, and comparing the estimated merging acceleration rate with a threshold acceleration rate, where the threshold acceleration is an estimate of a typical acceleration rate of the driver at the intersection when no transverse traffic is present. In some examples, the traffic window may comprise a degree of overlap of a first traffic window in transverse traffic travelling in a first direction, and a second traffic window in transverse traffic travelling in a second direction. If the estimated merging acceleration rate to merge into the traffic window is higher than the threshold acceleration rate, an increased level of anxiety of the driver may be inferred, while if the estimated merging acceleration rate is lower than the threshold acceleration rate, an increased level of anxiety of the driver may not be inferred.

In this way, by detecting a traffic pattern where the driver may experience anxiety when the vehicle is stopped, the level of anxiety of the driver may be reduced by disabling the stop-start function. An additional benefit of the systems and methods described herein is that by leveraging a connected vehicle fleet and connected elements of infrastructure on or intersecting a route of the vehicle, traffic data including vehicle location and velocity data and traffic light state and timing data received in real time over a V2V and/or V2X network may be used to detect traffic windows in the transverse traffic, estimate a feasibility of the vehicle merging into the transverse traffic, and predict the anxiety level of the driver. If there is a traffic light at the intersection, a subsequent engine start may be scheduled at or prior to a time at which a signal of the traffic light changes based on state information received from the traffic light via the V2X network. If there is no traffic light at the intersection, a subsequent engine start may be scheduled based on a position and/or change of position of a brake pedal and/or an acceleration pedal of the vehicle. By timing the stop-start function to minimize an idle time of the engine, an increased fuel efficiency of the vehicle may be achieved and an emissions of the vehicle may be minimized.

The technical effect of selectively disabling a stop-start function of a vehicle based on a predicted level of anxiety of a driver is that an optimal strategy for managing an anxiety level of the driver may be devised that reduces anxiety provoked by traffic patterns on a route of the driver, while exploiting the fuel efficiency of the stop-start control system.

The disclosure also provides support for a method for a vehicle, comprising, when approaching an intersection having a first traffic pattern, disabling a stop-start function of an engine of the vehicle responsive to an estimated merging acceleration rate for the intersection exceeding a threshold acceleration rate of the vehicle. In a first example of the method, the first traffic pattern has a high volume of traffic, where the stop-start function of the engine is disabled responsive to the estimated merging acceleration rate for the first traffic pattern exceeding the threshold acceleration rate of the vehicle, and a second traffic pattern has a low volume of traffic, where the stop-start function of the engine is not disabled responsive to an estimated merging acceleration rate for the second traffic pattern not exceeding the threshold acceleration rate of the vehicle. In a second example of the method, optionally including the first example, disabling the stop-start function includes, if the engine is on, maintaining the engine on even if other conditions are sufficient to stop the engine, and if the engine is off, starting the engine. In a third example of the method, optionally including the first and second examples, the first traffic pattern is a stream of transverse traffic of a plurality of vehicles travelling in one of a first direction from a left side of the vehicle to a right side of the vehicle, or a second direction from a right side of the vehicle to the left side of the vehicle, and the vehicle merges into the stream of transverse traffic in the first direction upon turning right at the intersection, or in the second direction upon turning left at the intersection. In a fourth example of the method, optionally including the first through third examples, the threshold acceleration rate is estimated based on calculating an acceleration rate of a driver of the vehicle after a right or left turn at the intersection when no transverse traffic is present, based on historical performance data. In a fifth example of the method, optionally including the first through fourth examples, the estimated merging acceleration rate is estimated based on: estimating a velocity and a location of a first approaching vehicle of the plurality of vehicles of the stream of transverse traffic, and based on the velocity and the location of the first approaching vehicle, estimating a time of the first approaching vehicle passing a location of the vehicle, estimating a velocity and a location of a second approaching vehicle of the plurality of vehicles, and based on the velocity and the location of the second approaching vehicle, estimating a time of the second approaching vehicle passing the location of the vehicle, estimating a traffic window in the transverse traffic, where the traffic window is a difference between the estimated time of the first approaching vehicle passing the location of the vehicle and the estimated time of the second approaching vehicle passing the location of the vehicle, and estimating the merging acceleration rate based on the velocity of the first approaching vehicle, the velocity of the second approaching vehicle, and the traffic window. In a sixth example of the method, optionally including the first through fifth examples, the transverse traffic is travelling in both the first direction and the second direction, the first approaching vehicle and second approaching vehicle are travelling in the second direction, and
the vehicle is turning left in the second direction, and estimating the merging acceleration rate further comprises estimating a first traffic window in the transverse traffic in the first direction, estimating a second traffic window in the transverse traffic in the second direction, estimating a combined traffic window, where the combined traffic window comprises an overlap of the first traffic window and the second traffic window, and estimating the merging acceleration rate based on the velocity of the first approaching vehicle, the velocity of the second approaching vehicle, and the combined traffic window in the transverse traffic. In a seventh example of the method, optionally including the first through sixth examples, estimating the velocity and the location of the first approaching vehicle and the second approaching vehicle includes receiving a velocity and a location of the first approaching vehicle and the second approaching vehicle via a vehicle-to-vehicle (V2V) network. In an eighth example of the method, optionally including the first through seventh examples, the intersection includes a traffic light, and a duration of a state of the traffic light is transmitted to the vehicle, and in response to the estimated merging acceleration rate for the intersection exceeding the threshold acceleration rate of the vehicle, a start of the engine is scheduled at an end of the duration. In a ninth example of the method, optionally including the first through eighth examples, the duration of the state of the traffic light is transmitted to the vehicle via a vehicle-to-infrastructure (V2X) cellular network. In a tenth example of the method, optionally including the first through ninth examples, the intersection does not include a traffic light, and in response to the estimated merging acceleration rate for the intersection not exceeding the threshold acceleration rate of the vehicle, the engine is started based on an output of a pedal position sensor. In an eleventh example of the method, optionally including the first through tenth examples, the pedal position sensor is one of an accelerator pedal position sensor or a brake pedal position sensor.

The disclosure also provides support for a method for a controller of a vehicle, comprising, in a first condition, disabling an engine stop-start of the vehicle in response to a predicted level of anxiety of a driver of the vehicle increasing at an intersection prior to merging into transverse traffic, even if conditions indicate an increased fuel efficiency of shutting off an engine of the vehicle, so that the engine is not shut off while the vehicle is stopped at the intersection, and in a second condition, stopping the engine of the vehicle in response to a predicted level of anxiety of the driver not increasing at the intersection prior to merging into transverse traffic and the conditions indicate an increased fuel efficiency of shutting off the engine, so that the engine of the vehicle is shut off while the vehicle is stopped at the intersection, to save fuel. In a first example of the method, the predicted level of anxiety of the driver is based on estimating a probability of the vehicle merging into transverse traffic, and in response to the probability of the vehicle merging into transverse traffic exceeding a threshold probability, receiving a location and a velocity of each vehicle of the transverse traffic, based on the location and a velocity of each vehicle of the transverse traffic, estimate a traffic window in the transverse traffic, the traffic window a duration between a time that a first approaching vehicle of the transverse traffic passes the vehicle and a time that a second approaching vehicle of the transverse traffic passes the vehicle, estimate a merging acceleration rate of the vehicle merging into the traffic window, the merging acceleration rate based on a velocity of the transverse traffic and the traffic window, and in response to the merging acceleration rate being above a threshold acceleration rate of the driver, predict an increased level of anxiety of the driver. In a second example of the method, optionally including the first example, estimating a probability of the vehicle merging into transverse traffic includes estimating a route of the vehicle based on one of an output of an onboard navigation system of the vehicle or historical driver data of the driver. In a third example of the method, optionally including the first and second examples, estimating a probability of the vehicle merging into transverse traffic includes estimating whether the merging vehicle is stopped in a position where the merging vehicle is facing a road of the transverse traffic based on an output of an onboard navigation system of the merging vehicle. In a fourth example of the method, optionally including the first through third examples, the threshold acceleration rate of the driver is estimated based on historical driver data, and the threshold acceleration rate of the driver is a function of a plurality of acceleration rates of the driver when turning onto a road with no traffic at a similar intersection.

The disclosure also provides support for a system for controlling an engine of a vehicle, comprising a stop-start controller of the engine of the vehicle, a controller with computer readable instructions stored on non-transitory memory that when executed during operation of the vehicle, cause the controller to, when at an intersection, estimate a probability that the vehicle will merge into transverse traffic, and in response to the probability exceeding a threshold probability, execute a selective inhibition routine of a stop-start function of the vehicle. In a first example of the system, executing the selective inhibition routine includes receiving a velocity and a location of each vehicle in the transverse traffic, based on the velocity and the location of each vehicle in the transverse traffic, estimating a merging acceleration rate of the vehicle to merge into the transverse traffic, and based on the merging acceleration rate of the vehicle being below a threshold acceleration rate for a driver of the vehicle, selectively disabling the stop-start function of the vehicle. In a second example of the system, optionally including the first example, selectively disabling the stop-start function of the vehicle includes one of turning the engine on while the vehicle is stopped at the intersection or leaving the engine on while the vehicle is stopped at the intersection.

Note that the example control and estimation routines included herein may be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a controller of a vehicle, the method comprising:
when approaching an intersection having a first traffic pattern,
estimating a merging acceleration rate for the intersection based on instructions stored in a memory of the vehicle and executed by the controller, the merging acceleration rate based on a velocity of an approaching vehicle passing the location of the vehicle; and
in response to determining that the merging acceleration rate is greater than a threshold acceleration rate of the vehicle, disabling a stop-start controller of the vehicle configured to stop an engine of the vehicle when the vehicle is idling.

2. The method of claim 1, wherein:
the first traffic pattern has a high volume of traffic, where the stop-start controller of the engine is disabled responsive to the estimated merging acceleration rate for the first traffic pattern exceeding the threshold acceleration rate of the vehicle; and
a second traffic pattern has a low volume of traffic, where the stop-start controller of the engine is not disabled responsive to an estimated merging acceleration rate for the second traffic pattern not exceeding the threshold acceleration rate of the vehicle.

3. The method of claim 1, where disabling the stop-start controller includes, if the engine is on, maintaining the engine on even if other conditions are sufficient to stop the engine, and if the engine is off, starting the engine.

4. The method of claim 1, wherein the first traffic pattern is a stream of transverse traffic of a plurality of vehicles travelling in one of a first direction from a left side of the vehicle to a right side of the vehicle, or a second direction from a right side of the vehicle to the left side of the vehicle, and the vehicle merges into the stream of transverse traffic in the first direction upon turning right at the intersection, or in the second direction upon turning left at the intersection.

5. The method of claim 1, wherein the threshold acceleration rate is estimated based on calculating an acceleration rate of a driver of the vehicle after a right or left turn at the intersection when no transverse traffic is present, based on historical performance data.

6. The method of claim 4, wherein the estimated merging acceleration rate is estimated based on:

estimating a velocity and a location of a first approaching vehicle of the plurality of vehicles of the stream of transverse traffic, and based on the velocity and the location of the first approaching vehicle, estimating a time of the first approaching vehicle passing a location of the vehicle;

estimating a velocity and a location of a second approaching vehicle of the plurality of vehicles, and based on the velocity and the location of the second approaching vehicle, estimating a time of the second approaching vehicle passing the location of the vehicle;

estimating a traffic window in the transverse traffic, where the traffic window is a difference between the estimated time of the first approaching vehicle passing the location of the vehicle and the estimated time of the second approaching vehicle passing the location of the vehicle; and estimating the merging acceleration rate based on the velocity of the first approaching vehicle, the velocity of the second approaching vehicle, and the traffic window.

7. The method of claim 6, wherein:
the transverse traffic is travelling in both the first direction and the second direction;
the first approaching vehicle and second approaching vehicle are travelling in the second direction; and
the vehicle is turning left in the second direction; and
estimating the merging acceleration rate further comprises:
estimating a first traffic window in the transverse traffic in the first direction;
estimating a second traffic window in the transverse traffic in the second direction;
estimating a combined traffic window, where the combined traffic window comprises an overlap of the first traffic window and the second traffic window; and
estimating the merging acceleration rate based on the velocity of the first approaching vehicle, the velocity of the second approaching vehicle, and the combined traffic window in the transverse traffic.

8. The method of claim 6, wherein estimating the velocity and the location of the first approaching vehicle and the second approaching vehicle includes receiving a velocity and a location of the first approaching vehicle and the second approaching vehicle via a vehicle-to-vehicle (V2V) network.

9. The method of claim 1, wherein the intersection includes a traffic light, and a duration of a state of the traffic light is transmitted to the vehicle, and in response to the estimated merging acceleration rate for the intersection exceeding the threshold acceleration rate of the vehicle, a start of the engine is scheduled at an end of the duration.

10. The method of claim 9, wherein the duration of the state of the traffic light is transmitted to the vehicle via a vehicle-to-infrastructure (V2X) cellular network.

11. The method of claim 1, wherein the intersection does not include a traffic light, and in response to the estimated merging acceleration rate for the intersection not exceeding the threshold acceleration rate of the vehicle, the engine is started based on an output of a pedal position sensor.

12. The method of claim 11, wherein the pedal position sensor is one of an accelerator pedal position sensor or a brake pedal position sensor.

13. A method for a controller of a vehicle, comprising:
in a first condition, disabling an engine stop-start controller of the vehicle based on instructions stored in a memory of the vehicle and executed by the controller, in response to a predicted level of anxiety of a driver of the vehicle increasing at an intersection prior to merging into transverse traffic, even if conditions indicate an increased fuel efficiency of shutting off an engine of the vehicle, so that the engine is not shut off while the vehicle is stopped at the intersection; and in a second condition, stopping the engine of the vehicle based on instructions stored in the memory and executed by the stop-start controller in response to a predicted level of anxiety of the driver not increasing at the intersection prior to merging into transverse traffic and the conditions indicate an increased fuel efficiency of shutting off the engine, so that the engine of the vehicle is shut off while the vehicle is stopped at the intersection, to save fuel.

14. The method of claim 13, wherein the predicted level of anxiety of the driver is based on:
estimating a probability of the vehicle merging into transverse traffic, and in response to the probability of the vehicle merging into transverse traffic exceeding a threshold probability:
receiving a location and a velocity of each vehicle of the transverse traffic;
based on the location and a velocity of each vehicle of the transverse traffic, estimate a traffic window in the transverse traffic, the traffic window a duration between a time that a first approaching vehicle of the transverse traffic passes the vehicle and a time that a second approaching vehicle of the transverse traffic passes the vehicle;
estimate a merging acceleration rate of the vehicle merging into the traffic window, the merging acceleration rate based on a velocity of the transverse traffic and the traffic window; and
in response to the merging acceleration rate being above a threshold acceleration rate of the driver, predict an increased level of anxiety of the driver.

15. The method of claim 13, wherein estimating a probability of the vehicle merging into transverse traffic includes estimating a route of the vehicle based on one of an output of an onboard navigation system of the vehicle or historical driver data of the driver.

16. The method of claim 13, wherein estimating a probability of the vehicle merging into transverse traffic includes estimating whether the merging vehicle is stopped in a position where the merging vehicle is facing a road of the transverse traffic based on an output of an onboard navigation system of the merging vehicle.

17. The method of claim 14, wherein the threshold acceleration rate of the driver is estimated based on historical driver data, and the threshold acceleration rate of the driver is a function of a plurality of acceleration rates of the driver when turning onto a road with no traffic at a similar intersection.

18. A system for controlling an engine of a vehicle, comprising:
a stop-start controller of the engine of the vehicle configured to stop an engine of the vehicle when the vehicle is idling;
a controller with computer readable instructions stored on non-transitory memory that when executed during operation of the vehicle, cause the controller to:
when at an intersection, estimate a probability that the vehicle will merge into transverse traffic; and
in response to the probability exceeding a threshold probability, disable the stop-start controller.

19. The system of claim 18, wherein further instructions are stored on the non-transitory memory that when executed during operation of the vehicle, cause the controller to:
- when estimating a probability of the vehicle being able to merge into transverse traffic:
  - receive a velocity and a location of each vehicle in the transverse traffic;
  - estimate a merging acceleration rate of the vehicle to merge into the transverse traffic based on the received velocity and location of each vehicle in the transverse traffic; and
  - disable the stop-start controller based on the merging acceleration rate of the vehicle being below a threshold acceleration rate for a driver of the vehicle.

20. The system of claim 19, wherein selectively disabling the stop-start controller of the vehicle includes:
- in a first condition when the engine is on while the vehicle is stopped at the intersection, or leaving the engine on; and
- in a second condition when the engine is off while the vehicle is stopped at the intersection, turning the engine on.

* * * * *